US009146909B2

(12) United States Patent
Khorashadi et al.

(10) Patent No.: US 9,146,909 B2
(45) Date of Patent: Sep. 29, 2015

(54) WEB BROWSING ENHANCED BY CLOUD COMPUTING

(75) Inventors: Behrooz Khorashadi, Santa Clara, CA (US); Mohammad H. Reshadi, Santa Clara, CA (US); Saumitra M. Das, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/192,064

(22) Filed: Jul. 27, 2011

(65) Prior Publication Data

US 2013/0031459 A1   Jan. 31, 2013

(51) Int. Cl.
*G06F 17/00*  (2006.01)
*G06F 17/22*  (2006.01)
*G06F 17/30*  (2006.01)

(52) U.S. Cl.
CPC ...... *G06F 17/2247* (2013.01); *G06F 17/30014* (2013.01); *G06F 17/30905* (2013.01)

(58) Field of Classification Search
CPC ................................................. G06F 17/30014
USPC ......................................... 715/205, 273, 864
See application file for complete search history.

(56) References Cited

U.S. PATENT DOCUMENTS

| 5,887,133 | A  | * | 3/1999  | Brown et al. ................. 709/200 |
| 6,665,659 | B1 | * | 12/2003 | Logan .................................. 1/1 |
| 6,874,019 | B2 |   | 3/2005  | Hamilton, II et al. |
| 7,146,416 | B1 | * | 12/2006 | Yoo et al. ...................... 709/224 |
| 7,167,863 | B2 | * | 1/2007  | Ellis et al. ............................ 1/1 |
| 7,246,134 | B1 | * | 7/2007  | Kitain et al. .......................... 1/1 |
| 7,353,246 | B1 | * | 4/2008  | Rosen et al. .................. 709/202 |
| 7,685,191 | B1 |   | 3/2010  | Zwicky et al. |
| 7,840,911 | B2 |   | 11/2010 | Milener et al. |
| 7,864,353 | B2 |   | 1/2011  | Choi et al. |
| 7,954,052 | B2 | * | 5/2011  | Curtis et al. .................. 715/234 |
| 8,112,502 | B2 | * | 2/2012  | Emmelmann ................. 709/219 |
| 8,250,054 | B2 | * | 8/2012  | Bennett ......................... 707/706 |
| 8,316,016 | B1 | * | 11/2012 | Hoelzle et al. ................ 707/723 |

(Continued)

FOREIGN PATENT DOCUMENTS

| JP | H10275108 A  | 10/1998 |
| JP | 2005115684 A | 4/2005  |

OTHER PUBLICATIONS

Blekas et al., Use of RSS Feeds for Content Adaptation in Mobile Web Browsing, ACM 2006, pp. 79-85.*

(Continued)

*Primary Examiner* — Cong-Lac Huynh
(74) *Attorney, Agent, or Firm* — Ryan N. Farr

(57) ABSTRACT

Methods and devices include a server and at least two web browsers operable on at least two different computing devices. Each browser reports results of processing and rendering of webpages to the server. The server aggregates the data. The server generates metadata from the aggregated browsers. The server transmits the generated metadata to at least one computing device. The computing device renders a webpage using at least a portion of the provided metadata. The metadata may identify portions of JavaScript that can be processed in parallel. The metadata may identify a library portion that does not have to be loaded. The metadata may identify a portion of the webpage that may be rendered first before a second portion of the webpage. Returning metadata to the computing device can assist the computing device in parsing, analyzing or executing the request for the webpage.

128 Claims, 25 Drawing Sheets

(56) References Cited

U.S. PATENT DOCUMENTS

| | | | |
|---|---|---|---|
| 8,458,604 B2* | 6/2013 | Lodico et al. | 715/760 |
| 2002/0078165 A1* | 6/2002 | Genty et al. | 709/217 |
| 2002/0161824 A1* | 10/2002 | Harris | 709/202 |
| 2002/0198939 A1* | 12/2002 | Lee et al. | 709/203 |
| 2003/0163444 A1* | 8/2003 | Kotzin | 707/1 |
| 2003/0226112 A1* | 12/2003 | Murata | 715/517 |
| 2004/0002993 A1* | 1/2004 | Toussaint et al. | 707/104.1 |
| 2004/0064431 A1* | 4/2004 | Dorner et al. | 707/1 |
| 2004/0133848 A1* | 7/2004 | Hunt et al. | 715/500 |
| 2004/0205460 A1* | 10/2004 | Gopalan | 715/500 |
| 2004/0205516 A1* | 10/2004 | Tufts | 715/501.1 |
| 2004/0220791 A1* | 11/2004 | Lamkin et al. | 703/11 |
| 2005/0208930 A1* | 9/2005 | Zmrzli | 455/414.4 |
| 2006/0136391 A1* | 6/2006 | Morris | 707/3 |
| 2006/0248442 A1* | 11/2006 | Rosenstein et al. | 715/501.1 |
| 2006/0271840 A1* | 11/2006 | Murata | 715/501.1 |
| 2006/0293950 A1* | 12/2006 | Meek et al. | 705/14 |
| 2007/0038931 A1* | 2/2007 | Allaire et al. | 715/526 |
| 2007/0162971 A1* | 7/2007 | Blom et al. | 726/17 |
| 2007/0255754 A1* | 11/2007 | Gheel | 707/104.1 |
| 2007/0256003 A1* | 11/2007 | Wagoner et al. | 715/501.1 |
| 2008/0010387 A1* | 1/2008 | Curtis et al. | 709/246 |
| 2008/0028334 A1* | 1/2008 | De Mes | 715/781 |
| 2008/0082509 A1 | 4/2008 | Bessieres et al. | |
| 2008/0109749 A1* | 5/2008 | Kraft et al. | 715/781 |
| 2008/0126944 A1* | 5/2008 | Curtis et al. | 715/733 |
| 2008/0133569 A1* | 6/2008 | Vu et al. | 707/102 |
| 2008/0177726 A1* | 7/2008 | Forbes et al. | 707/5 |
| 2008/0235566 A1* | 9/2008 | Carlson et al. | 715/205 |
| 2008/0294974 A1* | 11/2008 | Nurmi et al. | 715/204 |
| 2009/0069000 A1* | 3/2009 | Kindberg et al. | 455/414.3 |
| 2009/0100322 A1* | 4/2009 | Phillips et al. | 715/205 |
| 2009/0106279 A1* | 4/2009 | Bae | 707/100 |
| 2009/0138937 A1* | 5/2009 | Erlingsson et al. | 726/1 |
| 2009/0144158 A1* | 6/2009 | Matzelle et al. | 705/14 |
| 2009/0216639 A1* | 8/2009 | Kapczynski et al. | 705/14 |
| 2010/0023506 A1* | 1/2010 | Sahni et al. | 707/5 |
| 2010/0023855 A1* | 1/2010 | Hedbor et al. | 715/234 |
| 2010/0174774 A1* | 7/2010 | Kern et al. | 709/203 |
| 2010/0180186 A1* | 7/2010 | Skinner et al. | 715/205 |
| 2010/0180192 A1* | 7/2010 | Hall | 715/234 |
| 2010/0211638 A1* | 8/2010 | Rougier | 709/205 |
| 2010/0241940 A1* | 9/2010 | Rao et al. | 715/205 |
| 2010/0250516 A1* | 9/2010 | Maykov et al. | 707/709 |
| 2010/0251084 A1* | 9/2010 | Yoshida | 715/205 |
| 2010/0287134 A1* | 11/2010 | Hauser | 706/54 |
| 2010/0325607 A1* | 12/2010 | Meijer et al. | 717/106 |
| 2011/0035345 A1* | 2/2011 | Duan et al. | 706/12 |
| 2011/0060788 A1* | 3/2011 | Haybi et al. | 709/203 |
| 2011/0078593 A1* | 3/2011 | Matsui | 715/760 |
| 2011/0202827 A1* | 8/2011 | Freishtat et al. | 715/234 |
| 2011/0225520 A1* | 9/2011 | Watanabe | 715/760 |
| 2011/0239200 A1* | 9/2011 | Binsztok | 717/140 |
| 2011/0264731 A1* | 10/2011 | Knowles et al. | 709/203 |
| 2011/0302275 A1* | 12/2011 | Prodan et al. | 709/218 |
| 2011/0307561 A1* | 12/2011 | Gao et al. | 709/206 |
| 2012/0028643 A1* | 2/2012 | Falchuk et al. | 455/436 |
| 2012/0096073 A1* | 4/2012 | Elwood | 709/203 |
| 2012/0136825 A1* | 5/2012 | Harris | 707/608 |
| 2012/0159430 A1* | 6/2012 | Waldbaum et al. | 717/106 |
| 2012/0173967 A1* | 7/2012 | Lillesveen | 715/235 |
| 2012/0215833 A1* | 8/2012 | Chen et al. | 709/203 |
| 2012/0233312 A1* | 9/2012 | Ramakumar et al. | 709/224 |
| 2012/0239598 A1* | 9/2012 | Cascaval et al. | 706/12 |
| 2012/0254147 A1* | 10/2012 | Bennett | 707/706 |
| 2012/0297429 A1* | 11/2012 | Reed et al. | 725/86 |
| 2012/0317187 A1* | 12/2012 | Fredricksen et al. | 709/203 |
| 2012/0323940 A1* | 12/2012 | Davis et al. | 707/756 |
| 2013/0036124 A1* | 2/2013 | Ambwani et al. | 707/749 |
| 2013/0073401 A1* | 3/2013 | Cook | 705/14.73 |
| 2013/0124301 A1* | 5/2013 | Bachman | 705/14.44 |
| 2013/0124621 A1* | 5/2013 | Lepeska et al. | 709/203 |
| 2013/0132392 A1* | 5/2013 | Kenedy et al. | 707/737 |
| 2013/0132824 A1* | 5/2013 | Dalal et al. | 715/234 |
| 2013/0144861 A1* | 6/2013 | Bennett | 707/710 |
| 2013/0191710 A1* | 7/2013 | Skrenta | 715/205 |
| 2013/0232399 A1* | 9/2013 | Anick et al. | 715/205 |
| 2013/0239212 A1* | 9/2013 | Bennett | 726/22 |
| 2013/0297561 A1 | 11/2013 | Mizrotsky et al. | |
| 2014/0149850 A1 | 5/2014 | Khorashadi et al. | |
| 2014/0214878 A1* | 7/2014 | Morse et al. | 707/758 |
| 2015/0161256 A1* | 6/2015 | Jeh | 707/707 |

OTHER PUBLICATIONS

Ahmadi et al. Efficient Web Browsing on Small Screen, ACM 2008, pp. 23-30.*

Ivory et al., Empirically Validated Web Pages Design Metrics, ACM 2001, pp. 53-60.*

Watson, Application Design for Wireless Computing, IEEE 1994, pp. 363-373.*

International Search Report and Written Opinion—PCT/US2012/043081—ISA/EPO—Oct. 23, 2012.

Lu Y., et al., "Virtualized Screen: A Third Element for Cloud-Mobile Convergence", IEEE Multimedia, IEEE Service Center, New York, NY, US, vol. 18, No. 2, Feb. 1, 2011, pp. 4-11, XP011354753, ISSN: 1070-986X, DOI: 10.1109/MMUL.2011.33.

* cited by examiner

WEB BROWSING ENHANCED BY CLOUD COMPUTING

FIELD OF THE INVENTION

The present invention relates generally to computing devices. More particularly, the present invention relates to methods for supplying hints to a web browser to conserve resources on a computing device and for anticipating the web browser's next action.

BACKGROUND

Increasingly, people are using mobile computing devices to consume media. Generally in mobile computing devices, battery life is limited. Once the battery is depleted, the mobile device will shut down and cannot be restarted until a power outlet can be found or a new battery is provided. This can be very frustrating to a user since they cannot use the mobile device while the battery is drained. Additionally, there are times when the mobile device is inefficient. The mobile device will waste mobile bandwidth, processing and battery resources without the user's knowledge. For example, the mobile device browser may download a very large file, such as a library when only a portion of the library is needed. Additionally, users do not like long wait times for downloading webpages and become frustrated when a website or media source is not instantly displayed.

Some users generally follow certain daily browsing routines or habits of their mobile computing systems. For example, a user may access a portion of a webpage (e.g., stock quotes or sports scores) more frequently than other portions. Many users follow certain daily habits for consuming media. For example, if there is a newsworthy event that has recently taken place, many users will access the same webpage seeking the newsworthy content.

SUMMARY

Methods and devices enable improved web browsing on a computing device. The method includes a processor that transmits a request for a webpage from a computing device. The processor transmits a request from the computing device to a browser assistant. The browser assistant returns metadata to the computing device. The metadata assists the computing device in parsing, analyzing or executing the request for the webpage.

In another aspect, a system includes a server and at least two web browsers operable on at least two different computing devices. Each web browser reports the results of processing and rendering webpages to the server. The server aggregates the data and the server generates metadata from the aggregated web browser data. The server transmits the metadata to at least one computing device. The computing device renders a webpage using at least a portion of the metadata.

An aspect of the present application includes a method for rendering a webpage on a computing device that includes transmitting a request for a webpage from the computing device, transmitting a request from the computing device for a browser assistant, and returning metadata to the computing device to assist the computing device in parsing, analyzing, or executing the request for the webpage. In an aspect, the metadata returned to the computing device may include data that may be any one of JavaScript function execution probabilities, AST data for parsing data, script token data, lexing information, returned binary code from data processed at a server to assist the computing device, CSS metadata to assist in processing CSS webpage data at the computing device, JavaScript metadata to assist in processing JavaScript webpage data at the computing device, HTML metadata to assist in processing HTML webpage data at the computing device, and combinations thereof. In an aspect, the metadata returned to the computing device may include a plurality of observed users browsing statistics, and the method may further include using the plurality of observed browsing statistics to assist in loading portions of the webpage at the computing device before other portions. In an aspect, the metadata returned to the computing device may include statistics regarding a portion of code that has a predetermined probability of execution. In an aspect, the metadata returned to the computing device may include translated binary code resulting from JavaScript code executed on a server, and the method may further include transmitting the binary code to the computing device to maximize processing at the server and minimize processing at the computing device.

In an aspect, the method may further include sending analytics that correlate to portions of the webpage that are popular so a web browser on the computing device loads the popular portions first. Aspect methods may further include gathering habits of a user of the computing device, and preloading into memory webpage elements frequently accessed by the user. Aspect methods may further include gathering in a server usage information from a plurality of users corresponding to popular data of the plurality of web users, and generating metadata based on the usage information and an analysis of habits of the plurality of web users. Aspect methods may further include sending metadata from a local network computer to the computing device, gathering usage information from a plurality of users corresponding to popular data of other web users, and generating metadata using the local network computer. Aspect methods may further include gathering aggregate information on browsing habits based on a plurality of users as the users use a web browser, monitoring the plurality of users to generate the browsing habits using an instrumented web browser, and generating metadata based on the browsing habits of the plurality of users.

Aspect methods may further include generating metadata indicating a library is frequently downloaded, describing in the metadata that the library has a portion that is statistically likely needed before other portions for execution based on observed statistical information, and downloading the portion of the library first based on the metadata. In an aspect, the method may further include determining that the library has a most likely executable library portion based on statistical data, downloading the most likely executable library portion first before other portions of the library.

Aspect methods may further include monitoring a plurality of users during browsing, generating metadata indicating a statistical percentage of users are likely to view a first portion of a webpage before other portions, transmitting the first portion to the computing device before other portions of the webpage. In an aspect, the metadata may include a profile for a user of the computing device, and the method may further include generating metadata indicating a statistical percentage that the user is likely to view a first portion of a webpage before other portions based on the profile, generating metadata indicating a statistical percentage that the user is not likely to view a second portion of a webpage, downloading the first portion first to the computing device before other portions of the webpage, and downloading the second portion a time period after the first portion. Aspect methods may further include generating metadata indicating habits of other users browsing, determining which portions of webpages are statistically likely to be accessed before other portions of the webpage based on the metadata, determining that a second portion is likely not accessed frequently, communicating in the metadata that the second portion is not accessed frequently and downloaded lower in priority than portions statistically likely to be accessed.

Aspect methods may further include linking to a server via a wireless network, associating a browser with the server, collecting information for use by the computing device from the browser.

Aspect methods may further include providing hints using the metadata for a web browser to parse, analyze or execute the request that may include JavaScript, determining that the JavaScript is inefficient to process at the computing device, and transmitting a binary pre-compiled translation of the JavaScript.

Aspect methods may further include aggregating statistics regarding a plurality of web users browsing habits webpage, delivering the statistics in the metadata, using the statistics to conserve mobile resources by preloading statistically popular webpages before the webpages are requested at the computing device, downloading portions of the webpage that are popular, and omitting downloading second portions of the webpage that are not popular to conserve mobile resources. Aspect methods may further include sending browsing data from an Internet browser to a server, and generating the metadata from the browser data in the server. Aspect methods may further include sending data from an instrumental browser to a server, and generating the metadata from the data. In an aspect, the metadata returned to the computing device may include returning metadata from a peer device to the computing device that correlates to portions of the webpage that are popular with computing devices connected to the peer device so a web browser on the computing device loads the popular portions first.

Aspect methods may further include providing a client side monitoring system of browsing habits of a second computing device, sending the browsing habits to a server, sending metadata from the server to the computing device based on the client side monitoring system of the browsing habits of the second computing device. Aspect methods may further include generating metadata from browsing habits that include requests and responses to requests, and providing the metadata to a peer device that is a peer of the computing device.

Aspect methods may further include monitoring browsing habits of a plurality of users, sending the browsing habits to a server, formulating a plurality of observed profiles of the plurality of users based on the monitored browsing habits, monitoring the browsing habits of a computing device user, returning metadata from the server to the computing device based on at least one observed profile that matches the computing device user browsing habits.

Aspect methods may further include describing in the metadata that a first portion of code is analyzed, downloaded, parsed, or executed more often than a second portion, and reordering and downloading the first portion of code before the second portion. Aspect methods may further include describing in the metadata that a library includes a portion that is determined most likely to be executed, and downloading the most likely to be executed library portion before other portions of the library.

Aspect methods may further include transmitting the request for the browser assistant that is located on a server, determining that a web site is frequently accessed by the computing device, and uploading updated web site data to the computing device. Aspect methods may further include downloading first portions of webpages using the computing device before second portions based on statistical browsing habits contained in the metadata. Aspect methods may further include preloading portions of webpages using the computing device with the preloaded portions being identified using statistical browsing habits contained in the metadata.

Aspect methods may further include monitoring browsing habits from a plurality of users, determining that a webpage comprising webpage elements is frequently accessed, storing webpage elements on a cache based on the browsing habits to prevent the webpage elements from being deleted on the computing device, downloading the webpage elements from the cache before an anticipated request. In an aspect, the method may further include monitoring browsing habits that are derived from a single user's browsing habits, updating the webpage stored on the cache, pushing elements on the cache to the computing device at periodic intervals without the request, updating the webpage stored on the cache, and passing elements from the cache to the computing device. Aspect methods may further include returning metadata to the computing device in advance by pre-caching the metadata to assist the computing device in parsing, analyzing, or executing the requested webpage.

Aspect methods may further include returning metadata that allows the computing device to execute the webpage in a more efficient manner by executing necessary portions, and forgoing executing an entire webpage.

In various aspects, the browser assistant may be located on a server that is the same server that responds to the request for the webpage, on a peer computer device, or on another network device.

Aspect methods may further include transmitting a request for a webpage, in which the webpage includes portions, processing the portions using the browser assistant to result in native code, and returning native code to the computing device, in which the portions include JavaScript.

Aspect methods may further include transmitting a request for data, transmitting a request to a first device, returning metadata to a second device, and describing portions of the webpage in the metadata that have a likely statistical chance of execution based on monitored empirical data of requests and responses to requests.

The various aspects further include a computing device having a processor configured with processor-executable instructions to perform operations of the aspect methods described above. The various aspects may further include a computing device including means for performing the functions of the aspect methods described above. The various aspects may further include non-transitory processor-readable storage media having stored thereon processor-executable instructions configured to cause computing device processors to perform operations of the aspect methods described above.

The various aspects further include a server having a server processor configured with processor-executable instructions to perform operations of the aspect methods described above. The various aspects may further include a server including means for performing the functions of the aspect methods described above. The various aspects may further include non-transitory processor-readable storage media having stored thereon processor-executable instructions configured to cause a server processors to perform operations of the aspect methods described above.

The various aspects further include system including a server, a cellular communications network and a computing device (e.g., a mobile phone) in communication with the server via the cellular communications network, in which the server and the computing device are configured to perform operations of the aspect methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
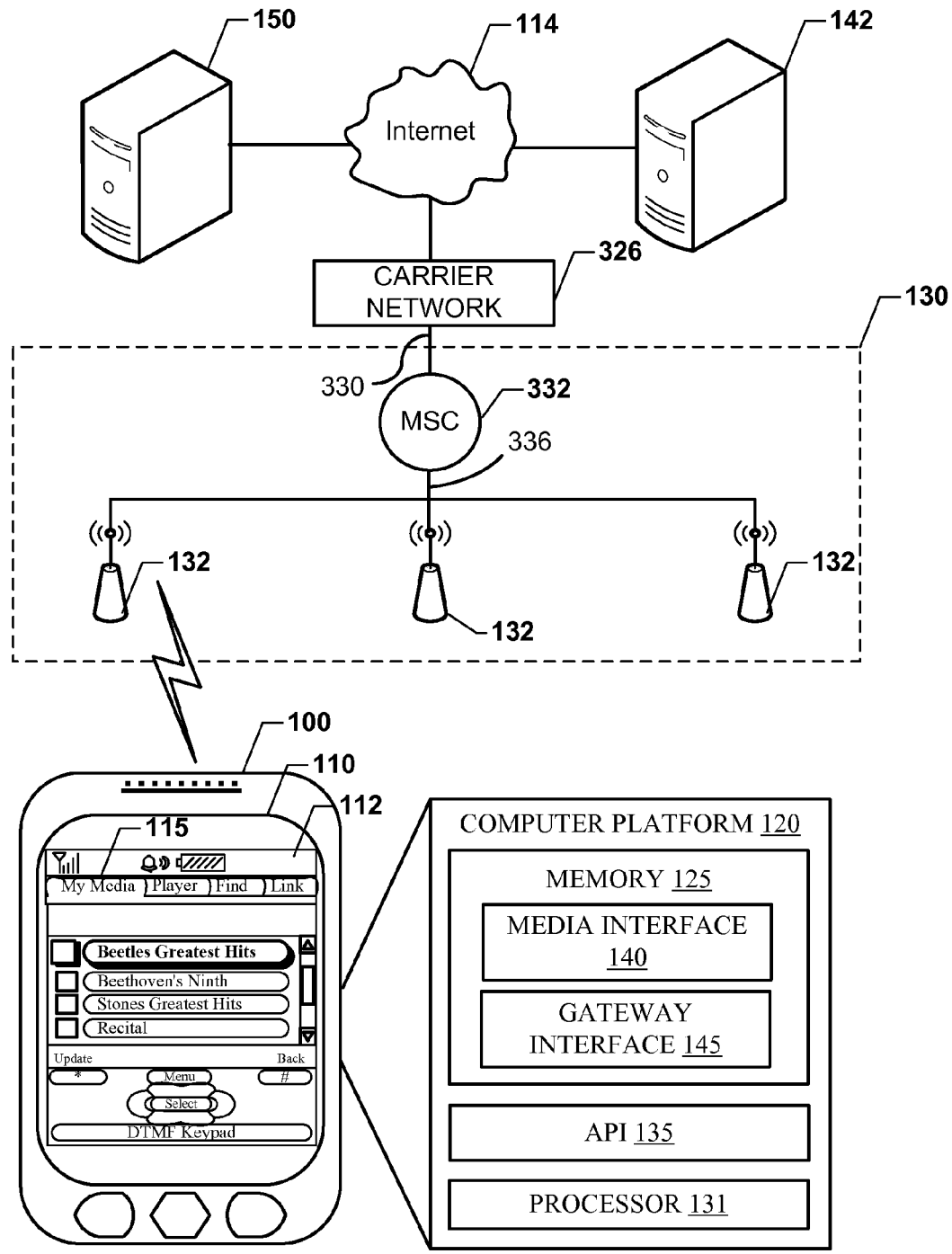
FIG. 1 is a communication system block diagram of a system for communicating with a mobile computing device.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as advantageous over other implementations.

As used herein, the terms "computing device," "mobile device," "mobile communication device," and "handheld device" refer to any one or all of cellular telephones, personal data assistants (PDA's), palm-top computers, wireless electronic mail receivers, multimedia Internet enabled cellular telephones, Global Positioning System (GPS) receivers, wireless gaming controllers, tablet computers, notebook computers, netbook computers, wireless email devices, and similar personal electronic devices that include a programmable processor and memory, and are configured to communicate with a communication network.

As used herein, the terms "computer," "personal computer" and "computing device" refer to any programmable computer system that is known or that will be developed in the future. In an aspect, a computer will be coupled to a network such as described herein. A computer system may be configured with software instructions to perform the processes and operations described herein.

As used herein, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The various aspects described herein provide methods and systems that use machine learning technology to improve the media rendering, particularly webpage rendering on computing devices, such as mobile devices. In one aspect, a cloud service distributed network improves a browser experience by anticipating the browser's next action and providing metadata to the mobile device to provide hints to the mobile device. A mobile device has limited and constrained resources. A mobile device has a relatively smaller memory and data which is downloaded is erased or written over regularly. Additionally, a mobile device has a finite amount of battery power. Generally, battery power cannot be wasted on speculative tasks, and may be used to improve performance and provide immediate information to a user. User habits may be used by the browser to allow it to act more efficiently to conserve mobile resources or proactively to prepare media for instant access. For example, the web browser may efficiently download and process content based on the user's browsing habits, which is advantageous as load times can be faster and battery life can be extended.

A browser assistant may improve cache behavior by monitoring browsing habits of a user or may monitor browsing habits of a number of different users. A browser assistant may provide hints to a mobile device and may improve cache behavior. For example, a server may push regularly visited pre-processed webpages to the mobile device.

In another aspect, a mobile device may detect when certain browsing data that is frequently used or accessed is about to be deleted due to memory constraints. In this event, the mobile device may request targeted services from a server, and upload the frequently accessed data to a server for later use by the mobile device. The server may mark the uploaded information and return the data to the mobile device at a later date/time. In another aspect, the server may optimize the data and return the optimized data to the mobile device.

In another aspect, the system may include a mobile device operatively connected to the Internet and a browser assistance server. The browser assistance server may also be operatively connected to the Internet and the mobile device. The browser assistance server may deliver metadata regarding websites to the mobile device. This metadata may provide hints on how the mobile device can efficiently handle a request for a webpage sent from the mobile device. For example, metadata may include information which enables the mobile device to anticipate the user's next browsing activity.

The metadata may be any information that allows the mobile device or the server to better parse, execute or analyze browser's requests. For example, the metadata may be XML, Ajax, or jSAW code. In an aspect, the mobile device may review the metadata from the browser assistance server when rendering the webpage. The metadata may provide a scheme for optimized browser execution of webpages. The browser may use the metadata to more efficiently handle a requested webpage. This may lead to faster execution times and lower power usage. For example, the metadata may provide information that certain data is frequently accessed or is popular among users. For example, using a push/pull framework, data that ordinarily would be erased that is popular or that is used frequently can be uploaded from the mobile device to a cache memory located on a server. The data can be dynamically cached and may be read by the mobile device when needed.

In an aspect, the metadata may include JavaScript metadata. The metadata may provide useful information including JavaScript function probabilities of certain phrases, script tokens, lexing information, AST parsing information, already compiled binary data, just in time data, or other hints to save time in processing JavaScript requests at the mobile device.

For example, the metadata may include CSS metadata including information such as simplified or optimized selectors, merging styles, or any other information to assist with processing, parsing, executing, or rendering CSS webpage data. In another aspect, the metadata may include hints on how to process a DOM tree in a parallel manner.

In an aspect, the metadata may include HTML metadata with partitioned code hints. The hints may instruct the mobile device to process encoded pages in parallel rather than serially. In an aspect, the metadata may include data from a number of other users and may describe analytics or patterns received from observing other user's browsing habits.

In an aspect, the analytics may indicate that a certain webpage element has a high probability of execution or may be very popular with other users. The mobile device may download those webpage elements based on speculation that the user may download the webpage element at some point. For example, using the analytics the metadata may indicate that a library includes a first portion that has a high probability of execution. The metadata may indicate that that library first portion should be transmitted or accessed immediately since it has a high probability of execution compared to other portions of the library. Another second portion may indicate a low probability of execution based on statistical information. The metadata may indicate that the second library portion need not be downloaded until later since the metadata indicates the second library has a low execution probability.

In an aspect, the browser assistance server using analytics may generate the metadata. The browser assistance server may observe relationships from a crowd's habits. The metadata may indicate that a certain webpage is frequently accessed. The metadata may indicate that a certain webpage element, for example, text located on the frequently accessed webpage, is viewed by ninety percent of the visitors to the webpage. The habit information may also be compiled by the browser assistance server based on the observed browsing habits of a number of users.

In yet another aspect, the metadata may be pre-cached on the mobile communication device and so that it may be provided to the mobile communication device in advance. For example, metadata may be transmitted to subscribing mobile devices at a predetermined time period in advance of when the user might need the information, such as during evening or early morning hours when network usage is low. Alternatively, the metadata may be transmitted as part of a synchronization procedure, such as for the top 100 websites that monitored users' access or the top 100 websites the user of the mobile communication device accesses. In some aspects, the metadata may not be provided on demand and may be provided before the request, during the request or after the request for a webpage. In one aspect, metadata may have a slower rate of change relative to web content, and thus may be pre-cached to the user's computer or mobile device at predetermined intervals. For example, the metadata may be supplied at a non-peak hour, such as late at night, or periodically, such as weekly.

When a newsworthy event occurs, users' web browsing may be monitored. The users' web browsing habits may indicate that users are sending requests from web browsers to a news website to view a particular text story and photo images. The webpage elements may have a high probability that the mobile device user may also view the webpage element based on the mobile device user's own browsing habits. The metadata from the browser assistance server may enable the mobile device to download content based on speculation that the user will download the text and webpage at some time.

In another aspect, the browser assistance server may collect information about the functions which were statistically executed by a number of users of particular webpages. In response, the browser assistance server may create an index of the statistical information. The browser assistance server may use this statistical information to deliver metadata to a number of mobile devices to enhance their users' web browsing experiences.

In an aspect, a code may be generated including HTML code, CSS, a first JavaScript function and a second JavaScript function and other code. The browser assistance server may observe that the first and second JavaScript functions were executed by many users more so than other functions on webpages. The browser assistance server may provide metadata to the mobile device including statistical information regarding the frequency or probability of execution of the first and second JavaScript functions. The metadata may enable the mobile device to optimize performance of the web browser using the metadata.

In another aspect, the mobile device may request analysis information from the browser assistance server. The analysis information may be for a particular requested webpage. The request to the browser assistance server may include context information, user profile information, communication information, mobile device information, and/or web browser information. The request may allow the browser assistance server to return metadata that is relevant to the user.

In another aspect, the mobile device may be provided with targeted services. The mobile communication device may have a cache on the browser assistance server and the mobile device may store data on the cache. The cache may be a component of the server that transparently stores data so that future requests for that data can be served faster. The data that is stored within a cache might be values that have been computed earlier or duplicates of original values that are stored elsewhere. If requested data is contained in the cache (a "cache hit"), this request may be served by simply reading the cache, which is comparatively faster for the mobile device. Otherwise, the data has to be recomputed by the mobile communication device or fetched from its original storage location, which is comparatively slower. Hence, the more requests that can be served from the cache to the mobile communication device, the faster the overall system performance can be.

In an aspect, the browser assistance server may provide a targeted service for a number of mobile devices. For example, a mobile device may write to a cache on the browser assistance server including cached JavaScript or a cached library for future use. This may save processing time and battery life. For example, a mobile device or a browser assistance server may determine that data about to be erased on the mobile device is relevant to the user based on the user's browsing habits, and save the data in a cache associated with a server.

In another aspect, the server may optimize the cached data. For example, a profile of a user may be stored at the browser assistance server. For example, a browser assistance server may detect that a user downloads the same websites each day at 8:00 a.m. For example, the mobile device may run up against a memory limit later in the day. The mobile device may also detect that certain webpage elements will be used the next day at 8:00 a.m. The mobile device may write the webpage elements to the cache associated with the browser assistance server as an L2 cache. The mobile device may access the webpage elements from the cache the next day.

In another aspect, the browser assistance server may directly analyze and compile JavaScript in advance. The JavaScript may not have to be processed on the mobile communication device. This data may also be compiled for a predetermined architecture. The browser assistance server can provide a binary data that is rendered from the processed JavaScript. The binary data can be transmitted to the mobile device so the mobile device avoids compiling the JavaScript locally. The mobile device processor avoids parsing, executing, and just-in-timing phrases of a JavaScript execution path, and may render the elements faster.

FIG. 1 shows a communication system including a mobile device 100 that may include a display 110 that provides a graphical user interface (GUI) for remotely accessing and controlling personal media content. Such a GUI may include icons and shapes associated with functions which may be selected by pressing physical keys in a keypad that may be provided below the display 110, or by pressing the display itself when the display has touchscreen capability. The GUI display 110 may include icons shown as reference numeral 115.

Some of the components of the communication system that enable controlling network and device access on a mobile device 100 are illustrated in FIG. 1. To enable a mobile device 100 to access the Internet 114, and registration server 142, the mobile device 100 may communicate with a wireless network 130, such as a cellular communication network. The wireless network 130 may communicate with the Internet 114 via a carrier network 326 through a data link 330, such as the Internet, a secure LAN, WAN, or other network. The carrier network 326 controls messages (generally comprising data packets) sent to a mobile switching center (MSC) 332. The carrier network 326 communicates with the MSC 332. This communication may be to transfer data and voice information. The MSC 332 may be connected to multiple base stations (BTS) 132 by another network 336, such as a data network and/or Internet portion for data transfer and a POTS portion for voice information. A BTS 132 may wirelessly broadcast messages to, and receive messages from, the mobile devices 100, using predetermined voice and/or data packet services, such as Code Division Multiple Access (CDMA), short messaging service (SMS), or any other over-the-air methods.

Mobile devices 100 may be configured to include a computer platform 120 having a memory 125 in communication with a processor 131, such as via an application programming interface (API) 135 that enables interaction with any resident applications (e.g., a "media" interface 140 that works cooperatively with information communicated by the registration server 142 shown FIG. 1).

The platform 120 may also include a gateway interface 145. The gateway interface 145 may be a standard that defines how web server software can delegate the generation of webpages to a stand-alone application in an executable file. The gateway interface 145 may include CGI scripts written in any programming language or any scripting language. The gateway interface 145 has program instructions for a server 142 to pass a web user's request to an application program and to receive data back so to the gateway interface can forward the data to the user.

When the user requests a webpage (for example, by clicking on a highlighted word or entering a web site address), the server 142 may transmit the requested page. However, when a user fills out a form on a webpage and transmits the form, the form usually needs to be processed by an application program. The server 142 may transmit the form information to a small application program that processes the data and may transmit back a confirmation message using the gateway interface 145.

A browser assistance server 150 may also be provided. In an aspect, the browser assistance server 150 can be the same as server 142, or a different server. In another aspect, the browser assistance server may be software that is resident on multiple different computers.

The browser assistance server 150 may provide metadata to the mobile device 100 that is operatively connected to the Internet 114. The gateway interface 145 has program instructions for the browser assistance server 150 to pass a web user's request to an application program and for the server 150 to transmit metadata to the user. In one aspect, the metadata may be embedded into a header of the requested browsing data. In another aspect, the metadata may be separately transmitted from the requested browsing data.

When the user requests a webpage (for example, by clicking on a highlighted word or entering a web site address), a second request may also be provided to the browser assistance server 150 for the server 150 to transmit the requested metadata. In another aspect, the browser assistance server 150 can also receive the request for the webpage data to server 142 and in response send the metadata to the mobile device 100 without receiving a separate or second request. In another aspect, the metadata may be sent periodically without any request. For example, metadata may be delivered in a cycle, such as once every fifteen minutes.

Figure 2:
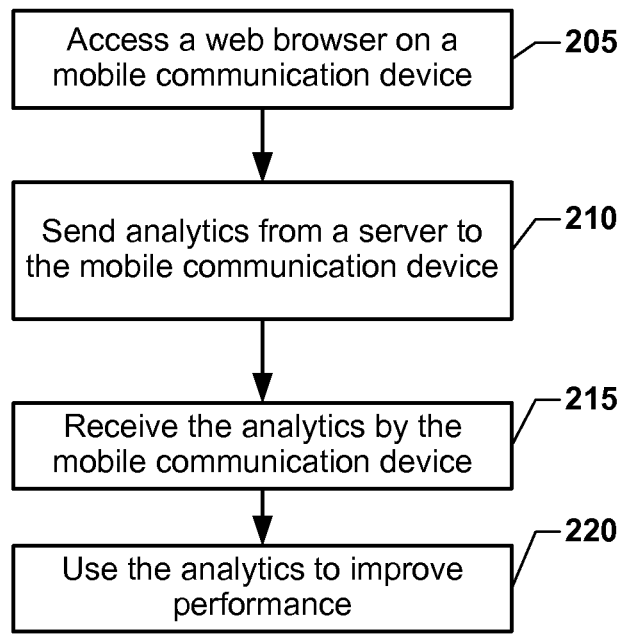
FIG. 2 is a process flow diagram of an aspect method using analytics to improve performance of a web browser.

FIG. 2 shows an illustration of an aspect method 200 for using analytics at a mobile communication device 100 to improve performance. Analytics may include any observed or calculated logical analysis that may enable a mobile device to improve performance. For example, the analytics may indicate that certain phrases have a higher likelihood of execution than other phrases, so that mobile device may download those phrases sooner on other phrases.

Method 200 may be implemented in a computing device having a processor 131 configured with processor-executable instructions to perform the operations of the method 200. In method 200, the processor of a mobile communication device 100 may commence operation at block 205 by accessing a web browser application. The web browser can be any web browser having program instructions for retrieving, presenting, and traversing information resources on the World Wide Web. An information resource is identified by a Uniform Resource Identifier (URI) and may be a webpage, image, video, or other data content. Hyperlinks present in web content enable users to easily navigate a browser to a related resource.

The web browser may bring information resources to a user of the mobile communication device 100. The user may input a Uniform Resource Identifier (URI) into the browser, or may click a link. Received HTML scripts may be passed to a browser's layout engine and be transformed from markup to an interactive document. The web browsers may generally display any kind of content that can be part of a webpage. Data may include image, audio, video, and XML file, Flash applications, and Java applets. Interactivity in a webpage may be supplied by JavaScript. JavaScript may be used along with other technologies to allow live interaction with the webpage's server via an Ajax programming language. JavaScript programs may produce interactive 2D graphics using the API and may render 3D graphics.

In block 210, the processor may send analytics from a server 150 to the mobile communication device 100. For example, the analytics may be delivered within metadata, but also the analytics may be delivered in other formats. The term metadata refers to any data about data, and can include information that provides hints to anticipate browser performance, or to assist a web browser or mobile communication device to improve performance.

Metadata may include data about a design and specification of data structures. Metadata may also include descriptive metadata which includes application data or data content. Metadata may also include statistical information and can be any description of the content and context of data files so a quality of the original data or files is greatly increased. For example, metadata may improve an experience of a user by assisting a mobile communication device to operate more efficiently to increase a life of the device.

In block 215, a second processor associated with the mobile communication device 100 may receive the analytics. This may be accomplished by the mobile communication device downloading the metadata directly from the server 150 or from an intermediary. In another aspect, the metadata may be embedded within data content. In another aspect, the metadata may be downloaded from a peer device or may be downloaded from a home network device. In block 220, the mobile communication device processor uses the analytics to improve performance. For example, the metadata may identify popular web content portions or content that has a high statistical likelihood of being executed.

Figure 3:
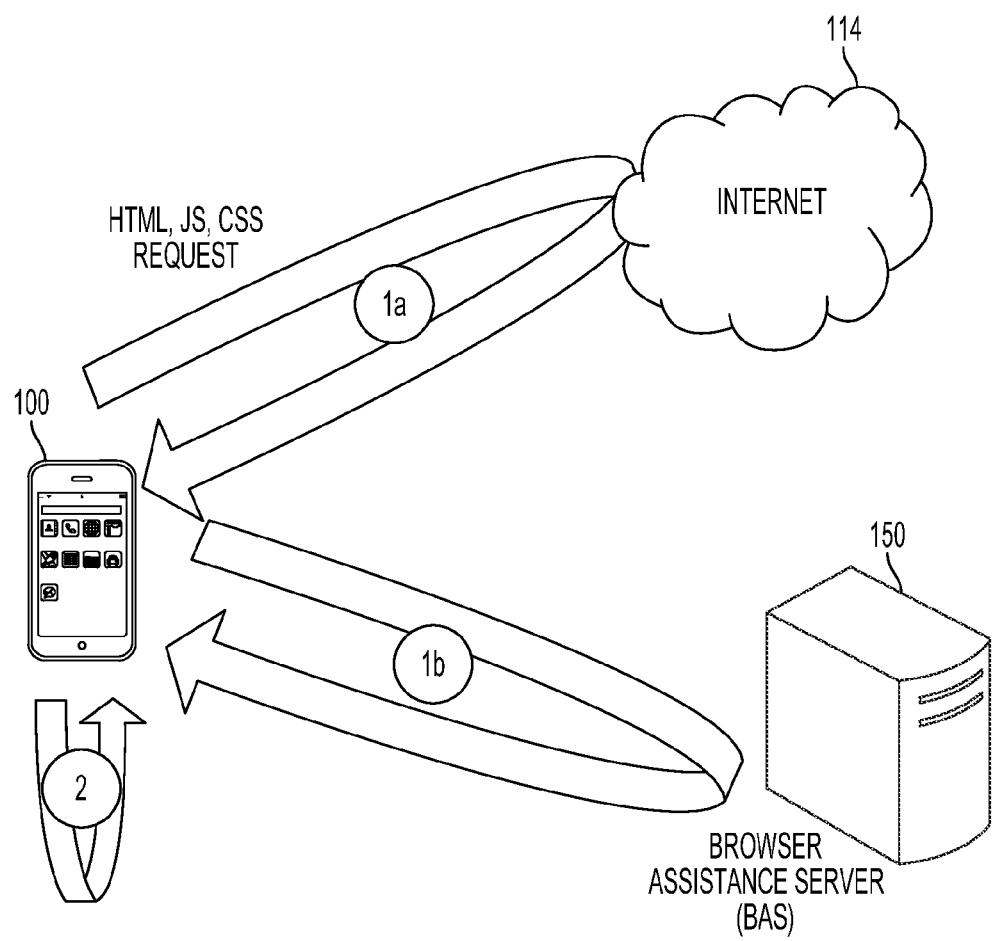
FIG. 3 illustrates a computing device communicating with a browser assistance server.

FIG. 3 shows a high level schematic of a mobile communication device 100 and a browser assistance server 150 connected to the Internet 114. A request for a webpage 1*a* may be transmitted from the mobile communication device 100 to the Internet 114. The request 1*a* may be for a webpage and may include a web uniform resource identifier. The request 1*a* may return HTML, XML, JavaScript, Cascading Style Sheets, XHTML, and data objects.

The mobile communication device 100A may transmit a second request 1*b* to a browser assistance server 150. The second request 1*b* returns metadata. The metadata may include hints that can anticipate a browser's next action on the mobile communication device 100. The metadata includes information which allows the mobile communication device to better parse, analyze, and/or execute a web browser's request 1*a*. The metadata may be in Ajax, XML, or J-SAW.

As shown by arrow 2, the mobile communication device 100 can use the metadata to more efficiently handle a requested webpage, which can lead to faster execution times, lower power usage, or less processing time. For example, using a first browser operable on the mobile communication device 100, the user may select a hyperlink. A request 1*a* for a webpage may be delivered to access HTML, XML, JavaScript, Cascading Style Sheets, XHTML, and data objects. The first browser may further send a second request 1*b* that is unknown by the user and that does not disrupt the browsing experience.

The browser assistance server 150 may receive the second request 1*b*. The browser assistance server 150 may improve performance by detecting that there exists JavaScript in the webpage that is about to be rendered. The browser assistance server 150 may have already compiled the JavaScript, or may compile the code immediately. The browser assistance server 150 may deliver the complied JavaScript into a binary file (or another native format) to the mobile communication device 100 browser. The compiled JavaScript binary file removes the burden of compiling the code on the processor on the mobile communication device, saving rendering time and processing resources. The precompiled JavaScript is rendered on the mobile communication device.

In another aspect, the browser assistance server 150 may receive both requests 1*a* and 1*b* and provide metadata and the web content. In another aspect, the browser assistance server 150 may provide a virtual machine on the mobile communication device 100 to allow sharing of the underlying physical machine resources between different machines, each running its own operating system. This may reduce the processing burden on a mobile device processor.

Figure 4:
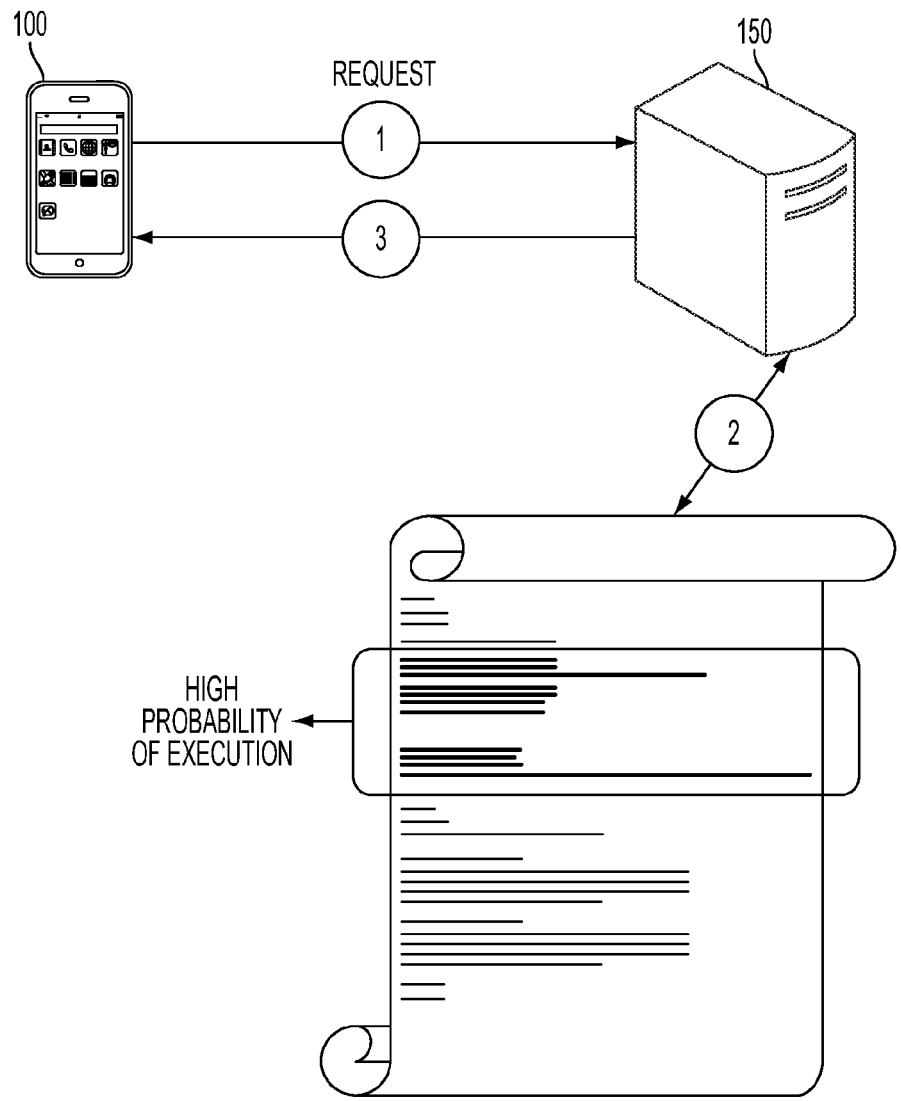
FIG. 4 illustrates how a certain predetermined portion of code has a high probability of execution that may be downloaded before other portions.

FIG. 4 illustrates a browser assistance server 150 and a mobile communication device 100 forming a request and sharing metadata and connected to the Internet 114. A request for a webpage may be sent from the mobile communication device 100 to a server on the Internet 114. A request for a webpage may include a web uniform resource identifier. The Internet server may return HTML, XML, JavaScript, Cascading Style Sheets, XHTML, and data objects. A second request 1b also may be sent from the mobile communication device 100 to a browser assistance server 150.

The request 1 may return metadata 3 that includes hints for the mobile communication device's browser. The hints may anticipate a browser's next action on the mobile communication device 100. The metadata may include information which allows the mobile communication device 100 to better parse, analyze, and/or execute a web browser's request 1. The browser assistance server 150 may also process a request 1. The browser assistance server 150 may improve performance by detecting that there exists JavaScript portions in the webpage that have a high probability of execution and other second portions that have a low probability of execution based on statistical observed browsing patterns. Statistical observed browsing patterns may originate from various sources. For example, the statistical observed browsing patterns may be monitored from a number of monitored web browsers. The browser assistance server 150 may obtain empirical data and store the empirical data in an index. Alternatively, the statistical observed browsing patterns may be monitored from the mobile communication device 100. Alternatively, a third computing device may observe the browsing habits, and store the browsing habits in an index in a storage medium and upload the index to the browser assistance server 150.

Alternatively, the statistical observed browsing patterns may be observed from a number of peer devices. The BAS server 150 may study the browser data of the peer devices and store empirical data in the index.

In an alternative aspect, a programmer may include data indicating that some portions have a high probability of execution while others portions have a low probability of execution within the actual code to provide an indication to the mobile device 100. The browser assistance server 150 may pre-compile the JavaScript and transmit the high probability-of-execution portion of the JavaScript precompiled in a binary or native format.

The browser assistance server 150 may deliver the data or the metadata to the mobile communication device 100 as shown by arrow 3. The metadata may include hints to download the first high probability of execution portion while not downloading the second low probability execution portion. Alternatively, the metadata may include hints that the mobile device should download the first (high probability of execution) portion while downloading the second (low probability execution portion) at a later time.

Figure 5A:
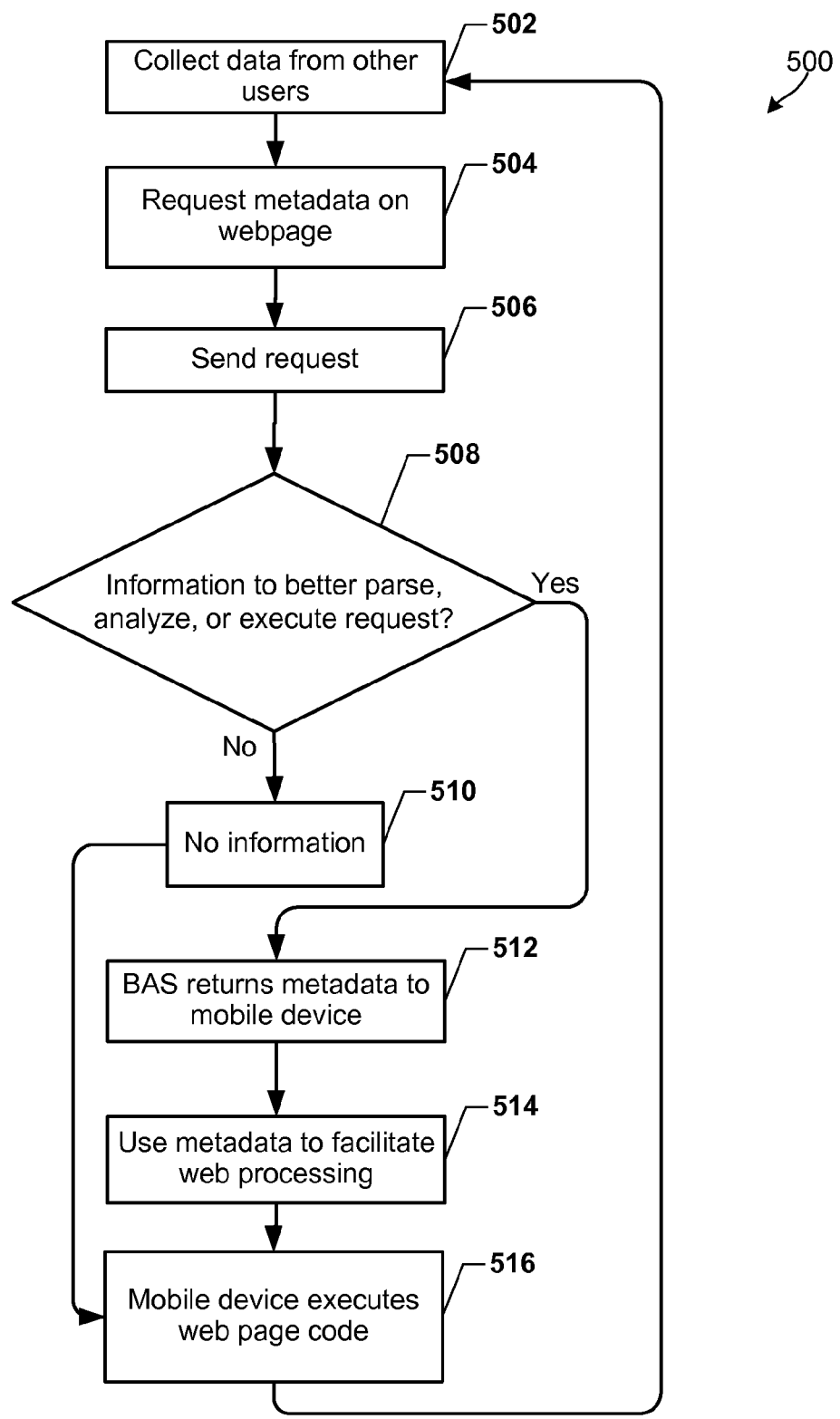
FIG. 5A is a process flow diagram of an aspect method to request metadata on a webpage from a browser assistance server.

FIG. 5A illustrates an aspect method 500 for returning metadata from a browser assistance server 150 to a mobile communication device to conserve power in a mobile device 100. Method 500 may be implemented in a computing device having a processor 131 configured with processor-executable instructions to perform the operations of the method 500.

In method 500, the processor 131 may commence operation at block 502 by collecting data from a number of other users in order to determine statistical information about webpage content. For example, the statistical information may include habit data indicating that certain web content elements have a high probability of being viewed or being executed based on the collected data. However, the data may include any other information that would lead to more efficient operation of the mobile device 100.

In block 504, the processor may request metadata on a webpage from a browser assistance server. In block 506, the processor may send a request from a mobile device for a webpage. In decision block 508, the processor may use the data collected from other users and the request to determine whether the browser assistance server has information to better parse, analyze or execute the request.

For example, the browser assistance server may determine that certain JavaScript includes a portion that has a high probability of execution based on observed statistics. If so (i.e., decision block 508="Yes"), which indicates information exists to better parse, analyze, or execute the request by the processor at the server 150, the processor may return metadata to the mobile device in block 512. On the other hand, if the BAS 150 does not have information to better parse, detect or analyze the request for the mobile device 100 (i.e., decision block 508="No"), the processor may have no metadata to return in block 510. The mobile communication device may execute the webpage code in block 516.

In block 512, the processor of the browser assistance server may return metadata to the mobile device. For example, the metadata may suggest that a portion of a library has a remote possibility of being utilized by the web browser and may not be downloaded immediately. In another aspect, the metadata may contain a binary file (or native language file) that corresponds to compiled JavaScript. This information may enable browser operations to be improved as the mobile device may not have to parse, analyze, or execute JavaScript.

In block 514, the processor of the mobile device can use the metadata to facilitate web processing. For example, the mobile processor may determine (using the metadata) that HTML included in webpages has sections that can be processed in parallel, rather than serially processed. The mobile processor may process the webpage elements in parallel based on the metadata. For example, the metadata may include JavaScript function probabilities, script tokens, or lexing information, and the mobile processor may use the metadata to render the webpage by executing JavaScript that has a high probability of execution while executing other portions later in time. In block 516, the processor for the mobile device may execute the webpage code and may render the webpage in a manner that is faster than an instance where the metadata hints are not provided.

Figure 5B:
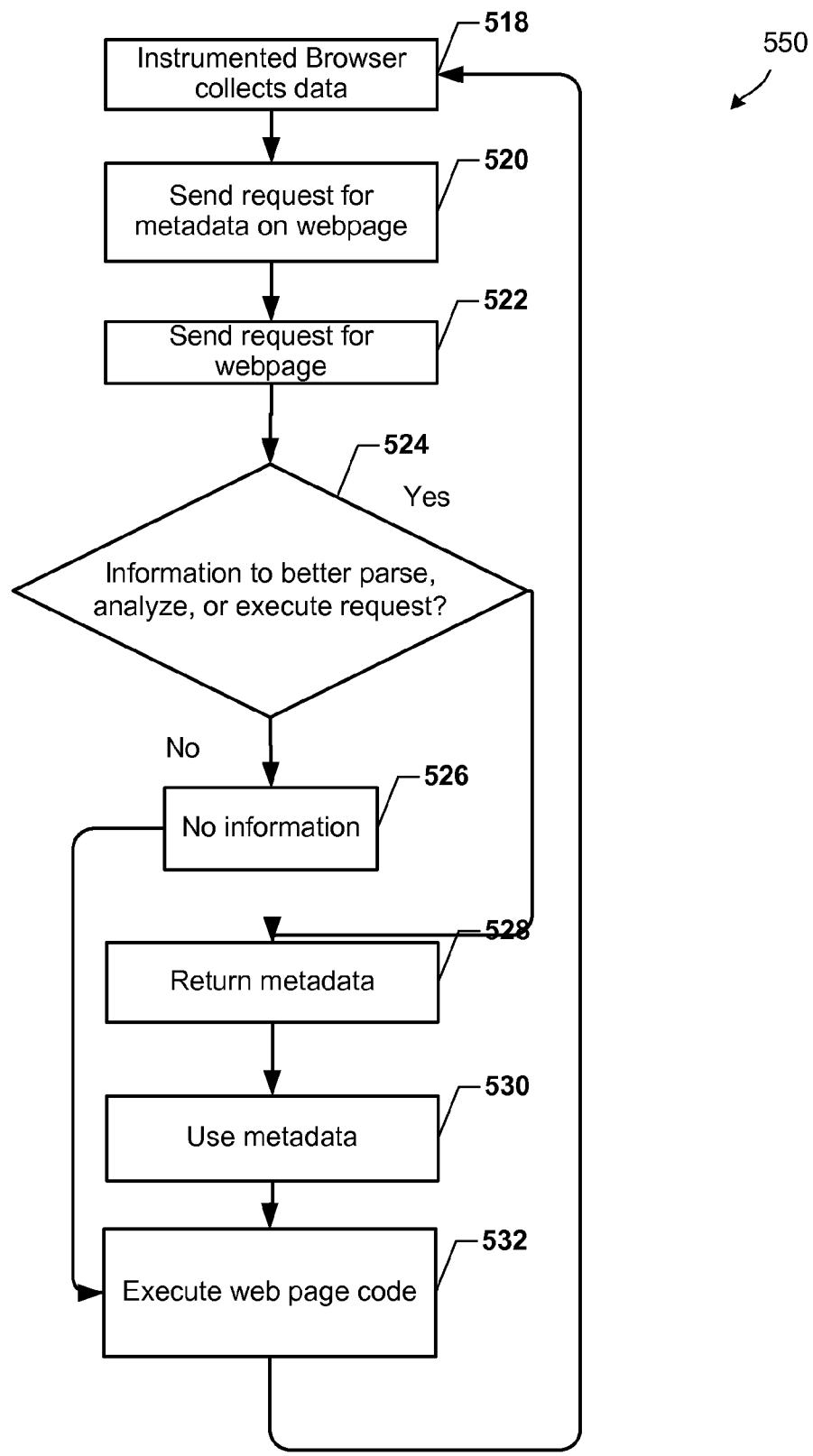
FIG. 5B is a process flow diagram of an aspect method to request metadata on a webpage from an instrumented browser.

FIG. 5B illustrates an aspect method 550 for use with an instrumented browser that collects data from a number of users and that returns metadata to a mobile communication device to conserve mobile resources in a mobile device 100. The instrumented browser may include at least one add on module to a web browser. The add on module may monitor a user's activity. The instrumented browser of a number of users may pool the habit data of many devices. For example, the instrumented browser may log keystrokes or may log inputs of a user to enable details of a user interaction to be monitored, collected, and recorded. The habit information may include empirical analytic data related to habits of the user(s) and logical relationships that can be used to improve a mobile device performance.

Method 550 may be implemented in a computing device having a processor 131 configured with processor-executable instructions to perform the operations of the method 550. In method 550, the processor 131 may commence operation at block 518 by a processor associated with an instrumented browser collecting data from a number of other web users in order to determine statistical information about webpage content. The statistical information may include data that certain web content elements have a high probability of being viewed or executed based on the collected data. In another aspect, the data may be particular to the user of the browser. For example, during browsing the user may have a habit of executing particular files or file types over other web elements. For example, the particular user may access financial sites that require JavaScript elements to be executed every morning at 8:00 a.m.

In block 520, the processor may request metadata on a webpage. In block 522, the processor may send a request from a mobile device for a webpage. In decision block 524, the processor may use the data collected from the instrumented browser to better parse, analyze, or execute the request. For example, the instrumented browser may determine that certain JavaScript includes a portion that has a high probability of execution based on observed statistics. Alternatively, the instrumented browser may determine that a user reviews the same webpage every day at 9:00 a.m. and certain data was cached for the next day so the instrumented browser does not need to download all of the webpage elements the next day.

If so (i.e., decision block 524="Yes"), which indicates that the instrumented browser has information to better parse, analyze or execute the request, the processor may return metadata to the mobile device in block 528. For example the metadata may indicate that a portion of a library has a remote possibility of being utilized by the web browser and may not be downloaded. In another aspect, the metadata may contain a precompiled binary (or native language) file that corresponds to JavaScript so the mobile device does not have to parse, analyze or execute JavaScript to assist the instrumented browser. Thus, the instrumented browser can simply use a native language to render the JavaScript phrase.

On the other hand, if the instrumented browser does not have information to better parse, detect or analyze the request for the mobile device 100 (i.e., decision block 524="No"), the processor may have no metadata to return in block 526 and a mobile communication device can execute the webpage code in block 532. In block 530, the processor of the mobile device can use the metadata to facilitate web processing. In block 532, the processor for the mobile device executes the webpage code and renders the webpage in a manner that is more efficient.

Figure 5C:
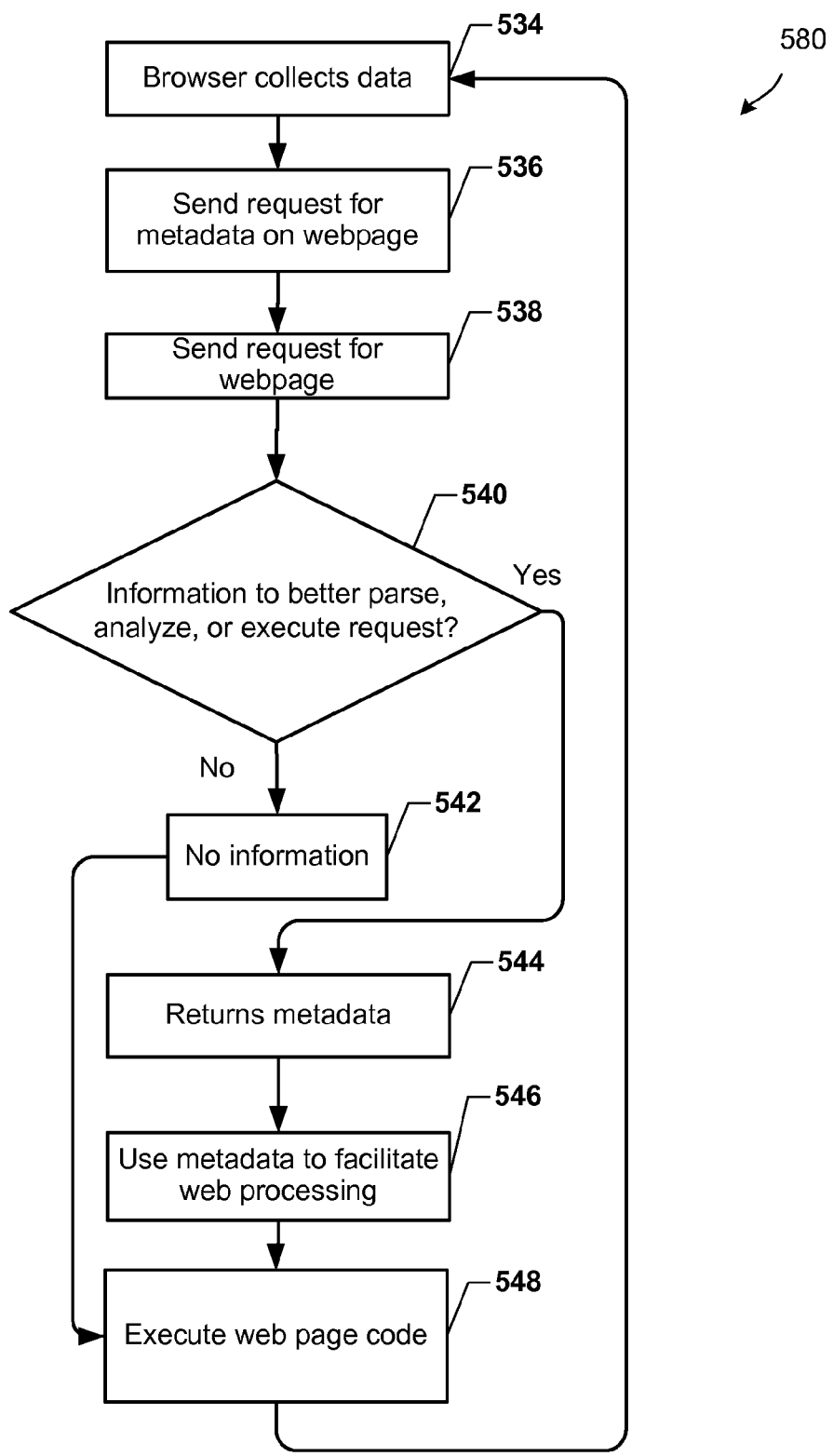
FIG. 5C is a process flow diagram of an aspect method to request metadata on a webpage from a web browser.

FIG. 5C illustrates an aspect method 580 for use with a web browser that collects data from a user and that returns metadata to a mobile communication device to conserve mobile resources in a mobile device 100. The browser monitors a user's activity. Method 580 may be implemented in a computing device having a processor configured with processor-executable instructions to perform the operations of the method 580. In method 580, the processor may commence operation at block 534. A processor associated with the web browser may collect data from a web browser session. This can be used to determine statistical information about a user's habits when viewing or browsing webpage content. For example, the data may be particular to the user of the browser. For example, the user has a habit of executing particular files or file types statistically over other elements.

In block 536, the processor may send a request for metadata on a webpage. In block 538, the processor may send a request from a mobile device for a webpage. In decision block 540, the processor may use the data collected from the user's web browsing to better parse, analyze or execute the request. For example, the browser may determine that certain JavaScript phrases include a portion that has a high probability of execution based on observed statistics. Alternatively, the browser may determine that a user reviews the same webpage every day at 9:00 a.m. and certain data is cached for the next day. Therefore, the browser does not need to download all of the webpage elements the next day and may operate more efficiently.

If so (i.e., decision block 540="Yes"), which indicates that the browser has information to better parse, analyze or execute the request, the processor may return metadata to the mobile device in block 544. On the other hand, if the browser does not have information to better parse, detect or analyze the request for the mobile device 100 (i.e., decision block 540="No"), the processor may have no metadata to return in block 542, and a mobile communication device may execute the webpage code in block 548. In block 544, the processor of the web browser may return metadata to the mobile device. In block 546, the processor of the mobile device can use the metadata to facilitate web processing. In block 548, the processor for the mobile device executes the webpage code and renders the webpage in a manner that is faster than an instance where the metadata hints are not provided.

Figure 6:
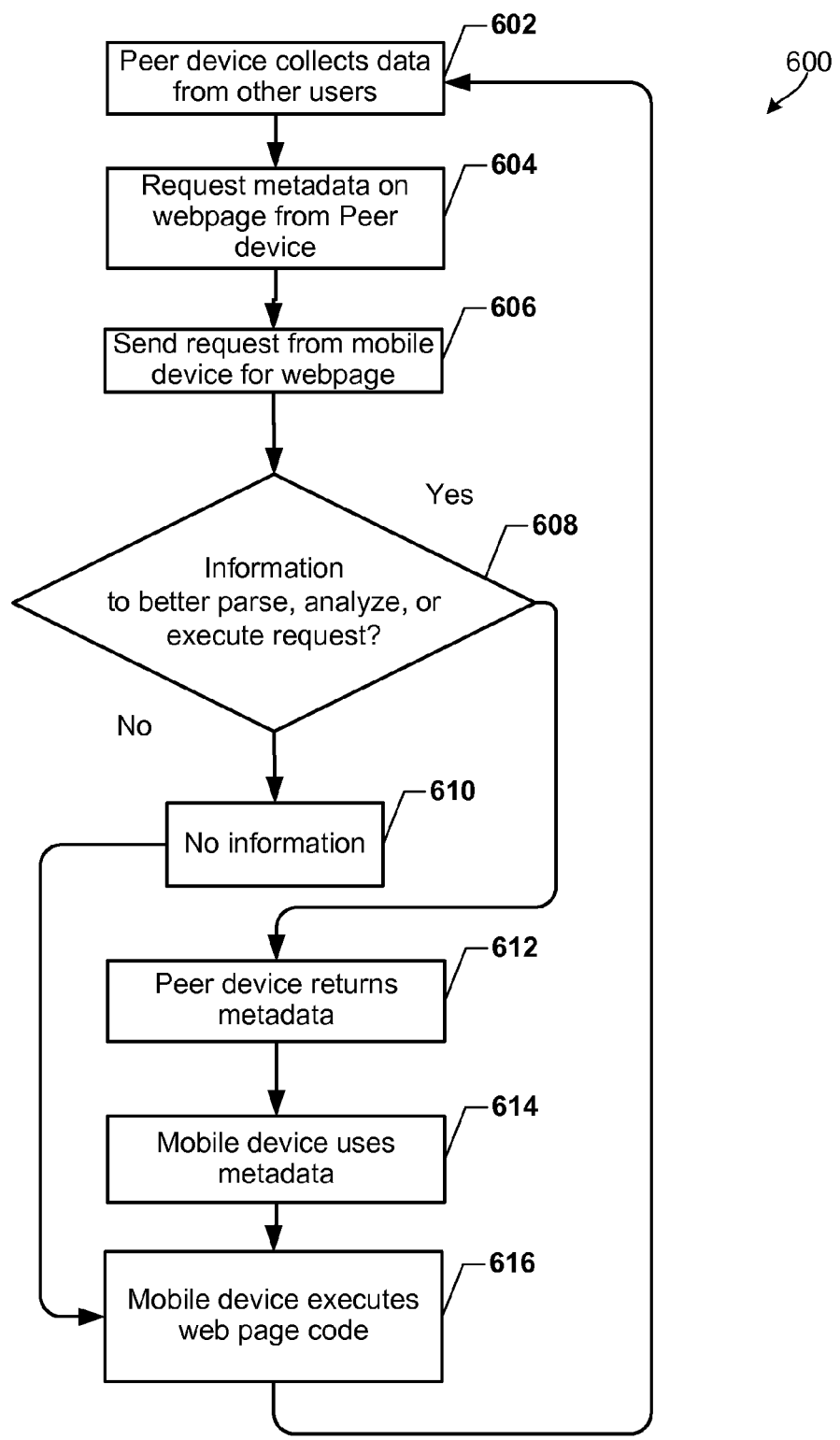
FIG. 6 is a process flow diagram of an aspect method to request metadata on a webpage from a peer device.

FIG. 6 illustrates an aspect method 600 that may be used with a peer device that collects data of a user and returns metadata to a mobile communication device to efficiently use mobile resources in a mobile device 100. The peer-to-peer device can be another mobile device, access point, other device, etc., that communicates with the mobile device and/or other devices (not shown). In one example, the peer device can be an independently powered device in a home or business that provides communication services in conjunction with or as an alternative to a base station. In addition, the peer-to-peer device can identify neighboring devices. In an example, the peer-to-peer device can receive or otherwise listen to downlink assignments from the base station to the mobile devices. The peer device can also receive or otherwise listen to uplink transmissions from the mobile devices over resources in the downlink assignments to identify the mobile devices (e.g. based on information within the uplink transmissions). The peer device may operate a web browser that monitors a user's activity.

Method 600 may be implemented in a computing device having a processor configured with processor-executable instructions to perform the operations of the method 600. In method 600, the processor may commence operation at block 602 by a processor of the peer device collecting data from a web browser session. This may be performed in order to determine statistical information about webpage content.

For example, the statistical information may include data that certain web content elements have a high probability of being viewed or executed based on the collected data. In another aspect, the data may be particular to the user of the browser. For example, the user may have a habit of executing particular files or file type statistically over other elements. The peer device may generate metadata to form hints to anticipate a browser's next action based on browsing habits that are observed on the mobile device. In another aspect, a peer device may receive metadata from other peer devices and may aggregate data regarding browsing habits of many users to form hints. In another aspect, the peer device may receive metadata from a browser assistance server and may share that metadata with other peer devices. In a further aspect, the peer device may collect the habit data.

In block 604, the processor may request metadata on a webpage. In block 606, the processor may send a request from a mobile device for a webpage. In decision block 608, the processor may determine if the data collected from the peer device can better parse, analyze or execute the request.

If so (i.e., decision block 608="Yes"), which indicates that the peer device has information to better parse, analyze or execute the request, the processor may return metadata to the mobile device in block 612. On the other hand, if the peer device does not have information to better parse, detect or analyze the request for the mobile device 100 (i.e., decision block 608="No"), the processor may have no metadata to return in block 610 and a mobile communication device may execute the webpage code in block 616.

In block 612, the processor of the peer device may return metadata to the mobile device. For example, the metadata can improve operations of the mobile device and metadata may instruct the mobile device browser that certain portions of webpages have a high likelihood of execution or a high likelihood of being viewed and may be downloaded based on data aggregated by the peer device (or by data learned by the peer device from another source). For example, the metadata may indicate that a portion of a library has a remote possibility of being utilized.

In block 614, the processor of the mobile device can use the metadata from the peer device to facilitate web processing. For example, the mobile processor may determine using the metadata that HTML included in webpages has portion that can be processed in parallel rather than serially processed. The mobile processor may process the webpage elements in parallel based on the metadata supplied from the peer device. In block 616, the processor for the mobile device executes the webpage code and renders the webpage.

Figure 7:
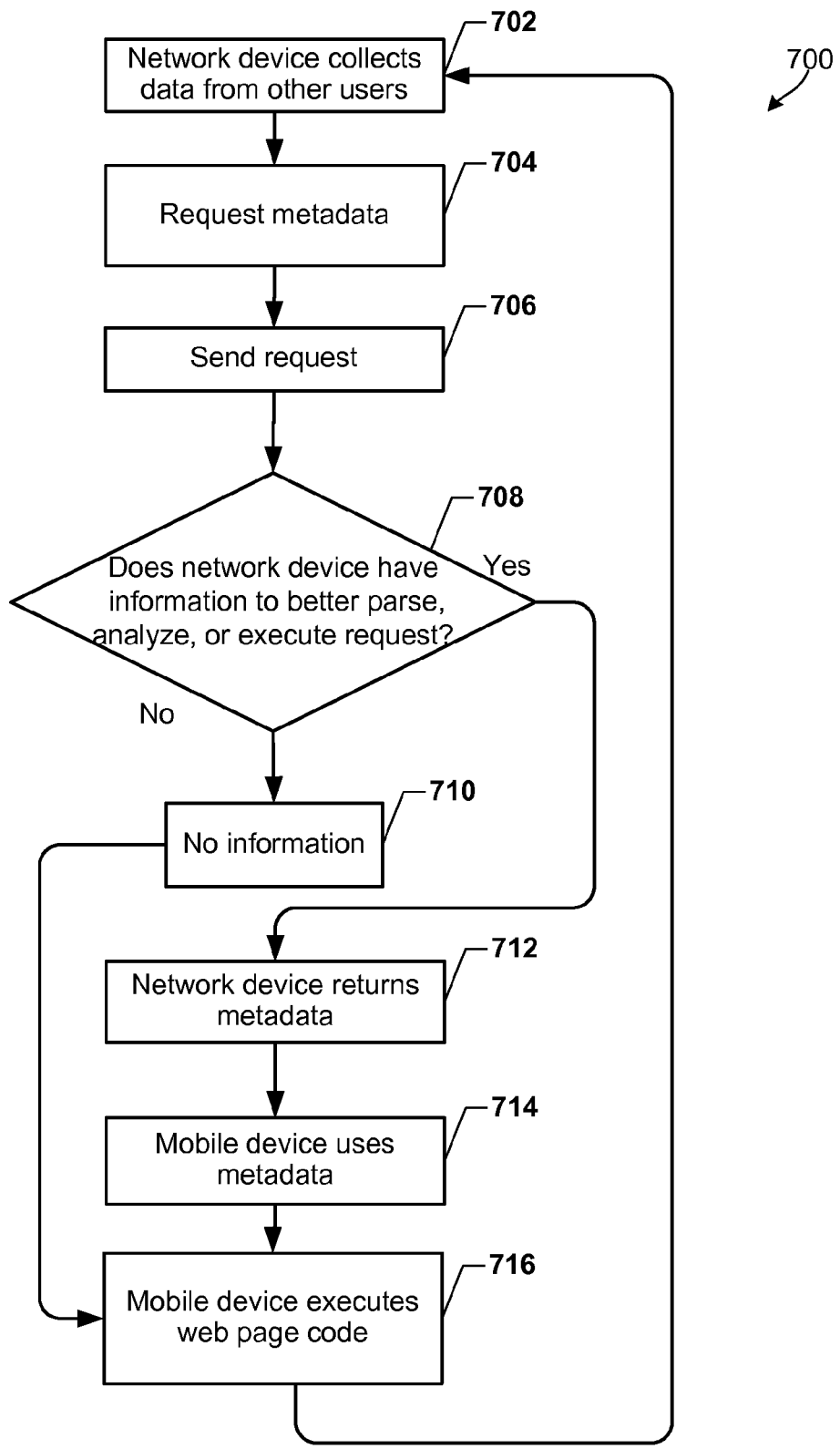
FIG. 7 is a process flow diagram of an aspect method to request metadata on a webpage from a home network computer that is linked to a mobile communication device to provide assistance to the mobile communication device.

FIG. 7 illustrates an aspect method 700 for use with a network device that collects data of a user and returns metadata to a mobile communication device 100 to enable the device to efficiently use its mobile device resources. For example, in this aspect, the mobile communication device 100 may form a portion of a home network, and receive and transmit data via the home network. For example, the home network may include a gateway connected to a computer and that forms an access point. For example, the mobile device 100 may include a wireless interface to access an access point that is connected to the Internet. A network computer having a processor and a memory may also be connected to a modem that is connected to the Internet.

The network device can be a desktop computer, a laptop computer, a mobile device, a tablet computer, or other device that communicates with the mobile device and/or other devices (not shown). The network device may monitor a user's activity on a web browser and may pair with the mobile device to provide data to the mobile device. Method 700 may be implemented in a computing device having a processor configured with processor-executable instructions to perform the operations of the method 700. In method 700, the processor associated with the network device may commence operation at block 702 by collecting data from a web browser session by a user in order to determine statistical information about webpage content. In another aspect, the network device may also communicate with a browser assistance server 150 via the Internet 114. The network device may also receive data from other users' web browsing habits. The network device may use the data to predict a web browser's next action. For example, the network computer device may generate metadata to form hints to anticipate a browser's next action based on browsing habits that are observed on the mobile device.

In block 704, the processor may request metadata on a webpage. For example, the metadata may be generated at the network device, a peer device, or a browser assistance server 150. In block 706, the processor may send a request from a mobile device for a webpage.

In decision block 708, the processor of the network device may determine if the network device has information that a browser can use to better parse, analyze or execute the request. For example, the network device may determine that certain JavaScript phrases include a portion that has a high probability of execution based on observed statistics. The network device may review the request and may determine that metadata is relevant to the request and may be sent to the mobile device browser.

If so (i.e., decision block 708="Yes"), which indicates that the network device has information to better parse, analyze, or execute the request, the processor may return metadata to the mobile device in block 712. On the other hand, if the network computer device does not have information to better parse, detect, or analyze the request for the mobile device 100 (i.e., decision block 708="No"), the processor may have no metadata to return in block 710 and a mobile communication device may execute the webpage code in block 716.

In block 712, the processor of the network device may return metadata to the mobile device as a separate file or embedded in a header of the content. In block 714, the processor of the mobile device can use the metadata from the network device to facilitate web processing. For example, based on a number of observed users, the metadata may indicate that a portion of a webpage is the most viewed webpage element based on statistical information. Metadata may indicate that the most viewed webpage element may be downloaded first before other webpage elements. Alternatively, the network device may communicate metadata that indicates that a library includes at least (1) a high probability executable portion or (2) a low probability execution portion. Metadata may indicate that the processor may download one portion first over another portion, a sequence or a schema. In block 716, the processor for the mobile device executes the webpage code and renders the webpage. By using the metadata hints mobile device resources are conserved.

Figure 8:
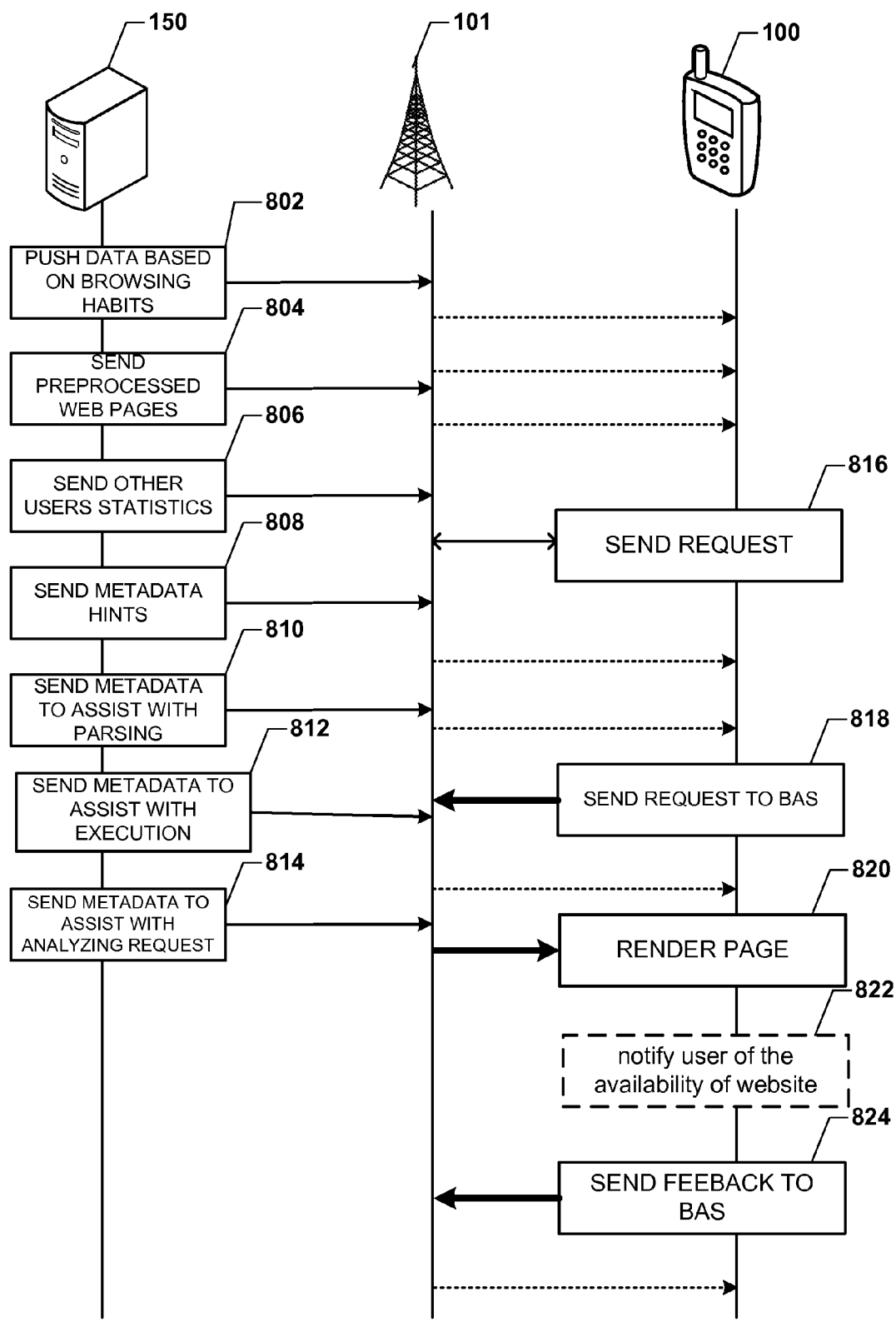
FIG. 8 illustrates a communication system block diagram of a server that sends hints to a mobile communication device for rendering a webpage.

FIG. 8 illustrates a high level communication diagram of a browser assistance server 150 delivering metadata or other packets 802-814 to a communication network via a base station 101 and to a mobile communication device 100. Metadata or other data packets 802-814 transmitted form no limitations and some metadata may be sent while other metadata is not sent. For example, depending on the request some metadata may be appropriate while other metadata may not be appropriate. Example data transmitted from the browser assistance server 150 may include data pushed based on browsing habits as shown by block 802. Preprocessed webpages that are in a native format for use by the mobile communication device 100 are shown as block 804. User statistic metadata 806, metadata hints 808, metadata to assist with parsing 810, metadata to assist with execution 812, and metadata to assist with analyzing a webpage request 814 may also be delivered to the mobile communication device 100 from the browser assistance server 150.

A mobile communication device processor may receive an input that a user clicked on a hyperlink indicating that the user seeks to open a first webpage using a web browser operable on the mobile communication device. In response, the mobile communication device 100 may send a request 816 for webpage content in block 816. The request 816 is transmitted to the mobile communication base station 101. For example, the base station 101 may send the request to a server 142 (FIG. 1) to obtain the web content.

A request to the browser assistance server in block 818 is transmitted to the base station 101. The base station 101 communicates the request to the browser assistance server 150. In response to the request, the browser assistance server 150 may deliver one or more metadata blocks 802-814, data, cached data, or other metadata, to assist the mobile communication device 100 with processing the webpage. Some data can be pushed to the mobile communication device without receiving any request 818.

For example, a mobile communication device 100 may periodically erase a memory and data contents due to space constraints. The metadata may indicate that some data content may be cached to a server 150 as targeted services on behalf of the mobile communication device 100. Alternatively, the cached data may be pushed to the mobile communication device at some future interval without any request. Using the metadata, the mobile communication device 100 may render the webpage 820 in an efficient manner. The mobile communication device 100 also will optionally notify the user of an availability of a web site in block 822. The mobile communication device 100 also may optionally provide feedback to the browser assistance server 150 in block 824 of a quality of service of the metadata.

Figure 9:
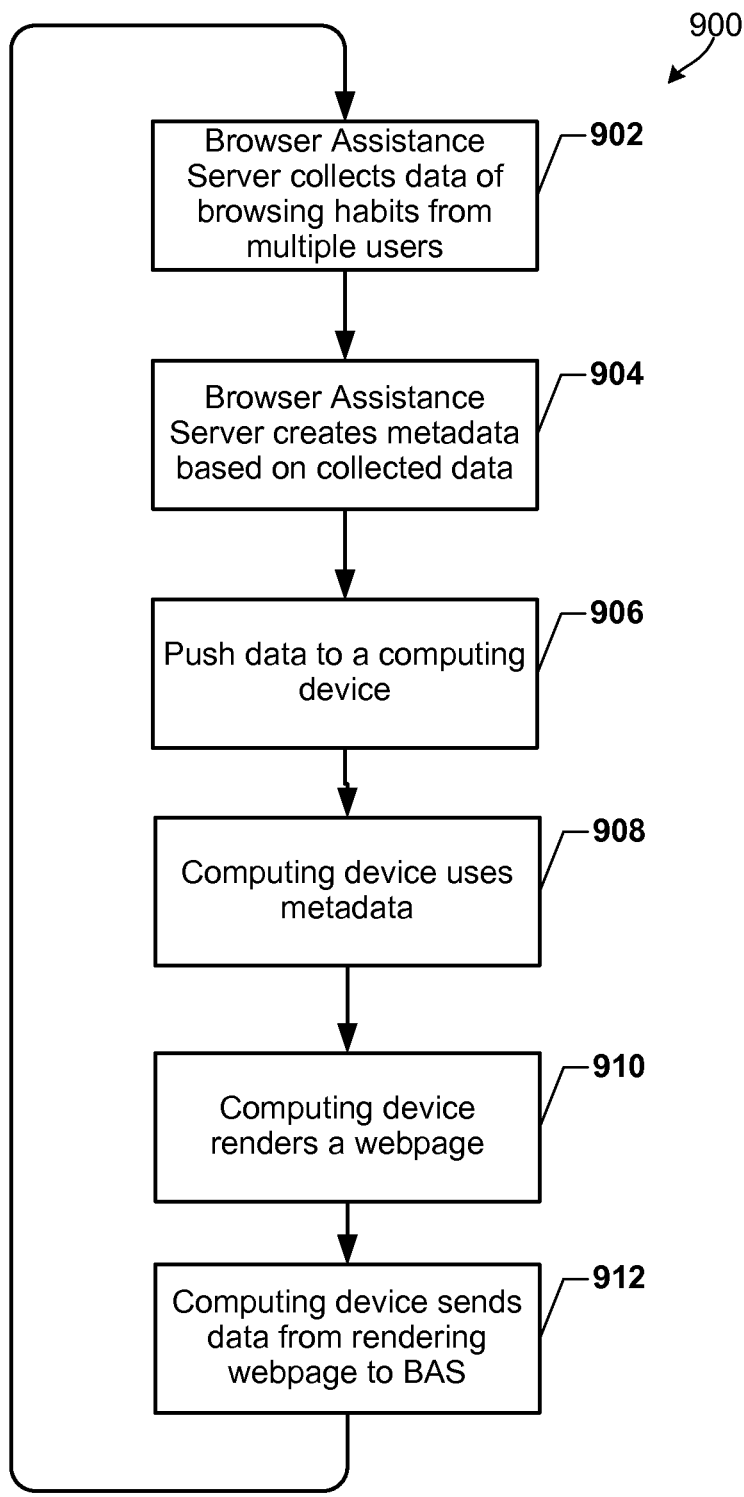
FIG. 9 is a process flow diagram of an aspect method to collect data from a number of different users' browsing habits and to create metadata which is pushed to a computing device to provide hints to render a webpage.

FIG. 9 illustrates an aspect method 900 for a browser assistance server 150 that pushes metadata to a computing device based on a number of browsing habits of multiple users. For example, the method 900 may use "crowd sourcing" or information collected from a large amount of web users. For example, the browser assistance server can monitor a large amount of requests and request responses, and infer empirical relationships between the browser request and response. The browser assistance server 150 can derive analytics from the request and response from a large number of web users. For example, these may include JavaScript function probabilities based on a number of measurements made for hundreds of mobile devices. For example, the empirical data may include the JavaScript phrases that are executed, loaded, viewed, analyzed, parsed, etc.

Method 900 may be implemented in a computing device having a processor configured with processor-executable instructions to perform the operations of the method 900. In method 900, the processor may commence operation at block 902 by a browser assistance server 150 collecting data regarding browsing habits of a number of users.

In block 904, the processor 131 of the browser assistance server creates metadata based on the collected data from a number of users. Metadata may include structured data about the browsing habits of a number of users. Metadata elements can be used to specify page description, keywords, and any other metadata not provided through head elements and attributes. The metadata element may emulate the use of the HTTP response header to embed additional metadata within the HTML document. Such metadata elements are placed as tags in the head section of an HTML or XHTML document.

In block 906, the processor 131 outputs program instructions so metadata is pushed from the browser assistance server 150 to the computing device. In another aspect, the metadata may be pulled from the browser assistance server to the computing device. In another aspect, the metadata may be embedded in other data. In another aspect, data may be continuously provided in a feed.

A processor of the computer device that receives the metadata may use the metadata in block 908. In block 910, the processor may use the metadata to render the webpage. In block 912, the processor may send data from the rendering webpage to the browser assistance server 150 to provide feedback.

Figure 10:
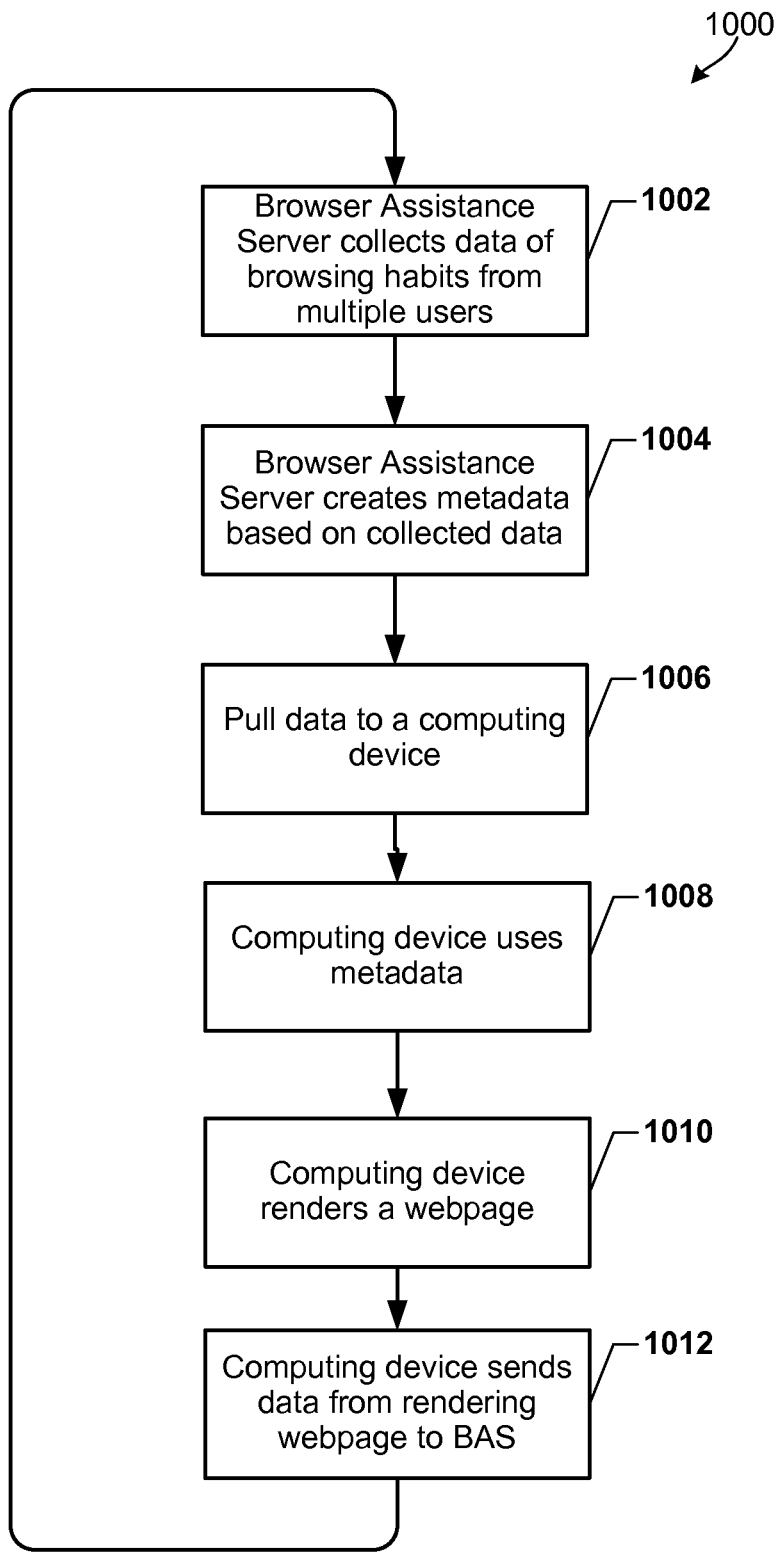
FIG. 10 is a process flow diagram of an aspect method to collect data from a number of different users' browsing habits and to create metadata which is pulled from a computing device to provide hints.

FIG. 10 illustrates an aspect method 1000 for a browser assistance server and a computer device that pulls metadata from the browser assistance server. The metadata may be based on a number of browsing habits of multiple users. For example, the method 1000 similar to FIG. 9 may use "crowd sourcing" or information collected from a large amount of web users. For example, the browser assistance server can use crowd sourcing or monitor a large amount of requests and request responses and infer empirical relationships between the request and response. The browser assistance server 150 can derive analytics from the request and response from a large number of web users.

For example, these may include JavaScript function probabilities based on a number of measurements made for hundreds of mobile devices. For example, the empirical data may include the JavaScript phrases that are executed, loaded, viewed, analyzed, parsed, etc. Method 1000 may be implemented in a computing device having a processor configured with processor-executable instructions to perform the operations of the method. In method 1000, the processor may commence operation at block 1002 by a browser assistance server 150 collecting browsing habit data for a number of users.

In block 1004, the processor of the browser assistance server 150 may create metadata based on the collected data from a number of users. Metadata may be created and stored in an index, which can be periodically updated. Metadata may include HTML elements or XHTML elements, which are used to provide structured data about the browsing habits of a number of users. Metadata elements can be used to specify page description, keywords, and relationships through the other head elements and attributes. In another aspect, metadata elements may emulate the use of the HTTP response header or embed additional metadata in an HTML document.

In block 1006, the processor of the computing device outputs program instructions so metadata is pulled from the browser assistance server 150 to the computing device. Pull technology includes network communication where an initial request for metadata originates from a client and is responded to by the browser assistance server 150. In another aspect, the metadata may be pushed from the browser assistance server 150 to the computing device without any request. In another aspect, the metadata may be embedded in other data, or may be provided in a feed.

The processor uses the metadata in block 1008. For example, the metadata may indicate that a library element has a very small chance of execution, while a second library element has a 90 percent chance of execution. The processor can use the metadata to download the second element immediately, while not downloading the first library element until some time later. In block 1010, the processor may use the metadata to render the webpage. In block 1012, the processor sends data from the rendering webpage to the browser assistance server 150 to optionally provide feedback. In yet another aspect, the feedback information may be provided in a pushed feed to the browser of the computing device.

Figure 11:
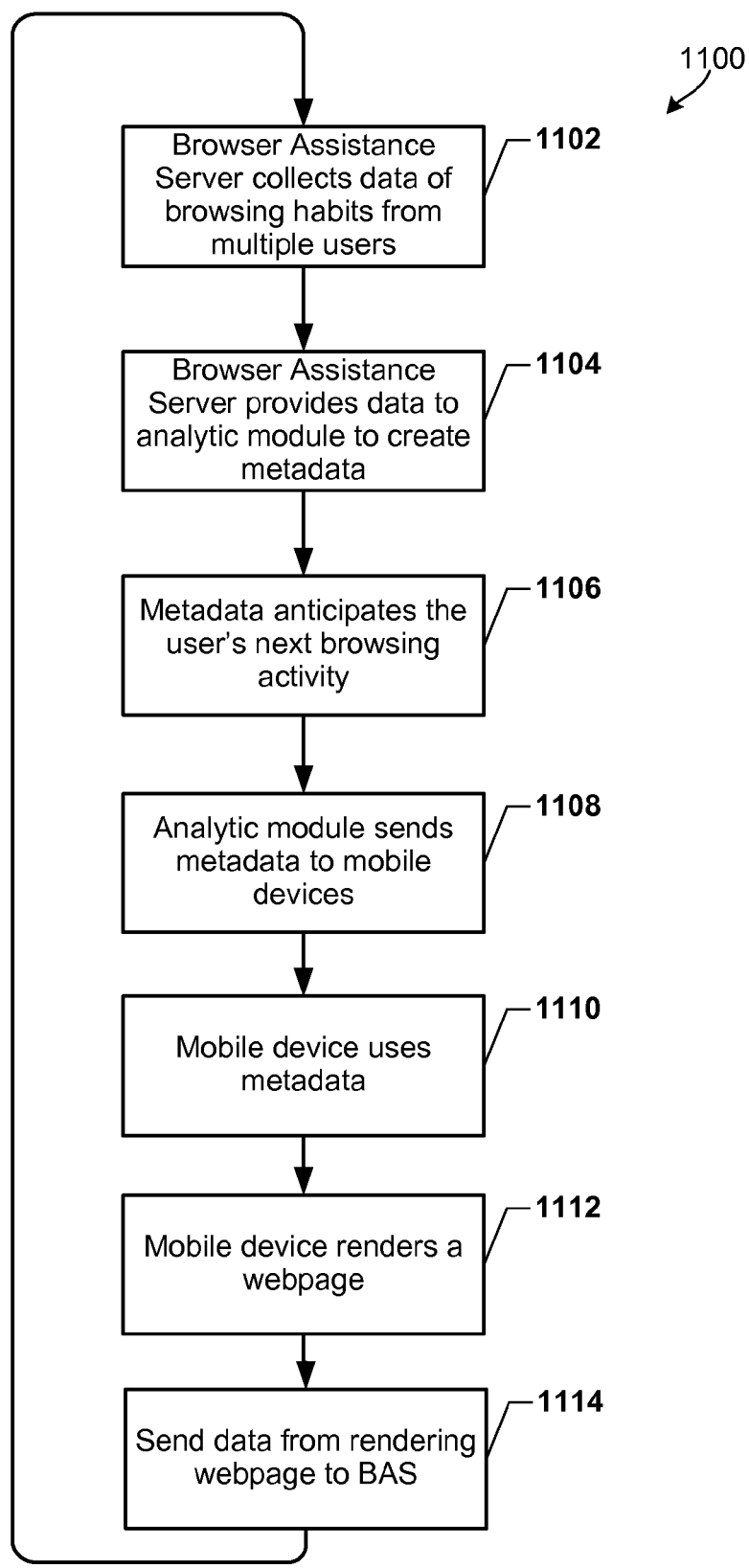
FIG. 11 is a process flow diagram of an aspect method to create metadata using an analytic module on a server.

FIG. 11 illustrates an aspect method 1100 for a browser assistance server that includes an analytical module that forms a schema to assist the mobile browser with processing, executing and analyzing web content with the schema based on observed relationships. The analytical module monitors measurements made from a number of computer devices. The module reviews requests and responses to the requests made by the computing devices and a web server. The analytical module generates empirical data and creates hints for a computer device that can improve operation of the computer device.

The data may comprise functional probabilities that certain webpage elements are parsed, executed, or analyzed. For example, the analytical module may determine JavaScript execution function probabilities based on measurements made from hundreds of mobile devices. The data may comprise: partition code hints; lexing information; script tokens; AST data for parsing; portions of HTML that can be processed in parallel or portions that can be processed serially; CSS webpage optimization data; cached data; or any other metadata that can conserve mobile resources. An analytic module may be associated with a browser assistance server 150, or alternatively may be associated with the computing device 100, and may include an algorithm to speculate regarding portions of JavaScript code that may be executed and compiled. In another aspect, the analytic module may be an intermediate device that can deliver metadata to the computer device. The analytic module may be a software module that includes an algorithm that can monitor user habits and that can generate metadata hints based on the observed empirical data.

Method 1100 may be implemented in a computing device having a processor 131 configured with processor-executable instructions to perform the operations of the method 1100. In method 1100, the processor 131 may commence operation at block 1102 by a browser assistance server 150 collecting data regarding browsing habits for a number of users.

In block 1104, the processor of the browser assistance server may provide data to an analytic module to create metadata based on the collected data from a number of users. The analytical module may create the metadata and store the metadata a storage medium, such as in an index, which can be periodically updated based on new information from browsing habits.

In block 1106, the metadata is generated so the metadata may anticipate the user's next browsing activity and may assist the browser by providing the information pertaining to the next browsing activity in advance. The webpage may comprise JavaScript with a high probability of execution based on empirical data observed from other users. The analytical module may detect that the browser's next step may be to process the JavaScript. The analytical module may output control instructions to pre-compile the JavaScript and form binary code (or other native code) and provide the binary code to the computing device. In block 1108, the processor outputs program instructions so the metadata is delivered from the analytical module to the computing device.

Processor 131 of the computer device that receives the metadata uses the metadata in block 1110. In block 1112, the processor renders the webpage. In block 1114, the processor may optionally send data from the rendering webpage to the browser assistance server to provide feedback.

Figure 12:
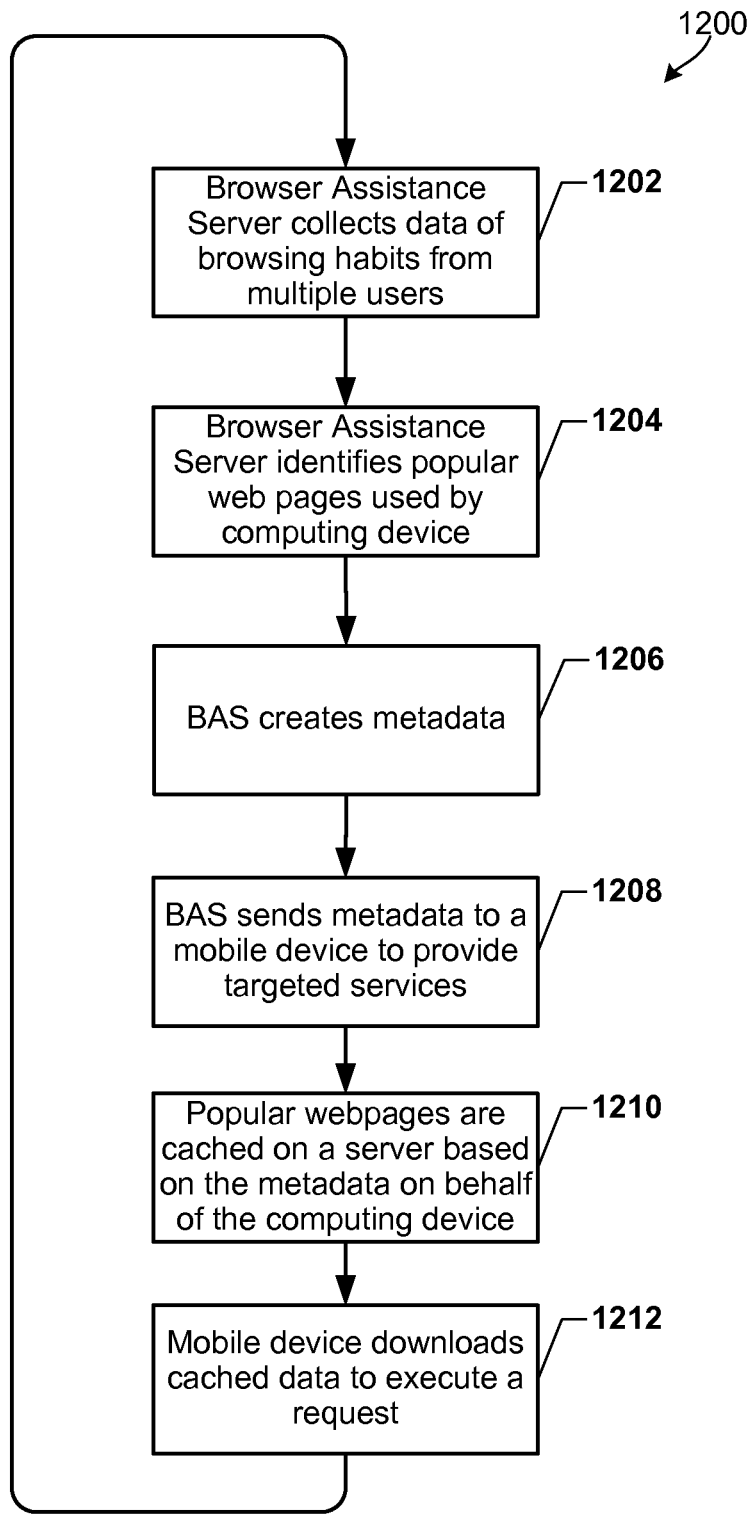
FIG. 12 is a process flow diagram of an aspect method to provide targeted services on behalf of a mobile communication device and to cache popular data on a server for the mobile communication device.

FIG. 12 illustrates an aspect method 1200 for a browser assistance server 150 that includes a feature to provide targeted services on behalf of a mobile communication device. The browser assistance server 150 allows the mobile communication devices to cache information on a storage medium (e.g., the browser assistance server memory) regarding predetermined websites.

For example, a website may be frequently accessed by a mobile communication device 100, such as daily at 8:00 a.m. The data can be written to the mobile device memory. However since the storage medium of the mobile communication device is constrained, a predetermined time later the storage medium may be full, requiring the data to be erased in favor of new data. Thus, the next day, the mobile communication device 100 at 8:00 a.m. will visit the predetermined site and will need to download some of the same web content elements again.

The browser assistance server 150 may detect repeated browsing behavior by comparing patterns in daily web browsing activity including requests and responses to requests. When repeated behavior is detected, for example, by requesting the same webpage in a predetermined sequence, the browser assistance server 150 may provide targeted services to the mobile communication device 100. The browser assistance server 150 may permit that mobile communication device 100 to write data to a storage medium (e.g., a cache memory). The cache memory may be associated with the browser assistance server 150, or may be a different storage medium.

For example, the browser may access the popular website at 8:00 a.m. and data is written to the mobile device memory. However, a predetermined time later since the memory of the mobile communication device is constrained, the memory can be full, and the data is designated to be erased in favor of new data associated with a later used website. Before erasing the data, the mobile communication device may upload the data associated with the website including web site elements to the cache located on the BAS server 150. Alternatively the browser assistance server 150 may obtain the data directly from the website and store it in the cache without requiring the mobile communication device to upload the data. The next day, the mobile communication device before 8:00 a.m. or at 5:00 a.m. may download the data from the cache on the BAS server 150. At 8:00 a.m., in the event that the user visits the predetermined popular web site, numerous web content elements will already be located on the mobile device memory and the mobile communication device will need to update the website. In another aspect, the cache memory may be located in another location, for example, a wireless hard drive or dongle. For example, a user profile of popular websites may be stored on the mobile communication device or may be stored on the server.

Method 1200 may be implemented in a computing device having a processor configured with processor-executable instructions to perform the operations of the method. In method 1200, the processor may commence operation at block 1202 by a browser assistance server 150 collecting data from browsing habits for a number of users.

In block 1204, the processor of the browser assistance server 150 may identify popular webpages used by the computing device. In block 1206, the browser assistance server may generate metadata so the metadata may anticipate the user's next browsing activity. In block 1208, the browser assistance server may send metadata to a mobile device to provide targeted services for the mobile device so the mobile device may use a cache memory of the browser assistance server. Processor of the mobile communication device that receives the metadata uses the metadata in block 1210 and identifies popular webpages that are frequently accessed are transmitted to the cache of the browser assistance server for storage.

In block 1212, the processor may render the webpage based on the user's habits and the mobile device processor may download the cache data to execute the request. The same webpage is not rendered and generally some webpage content may be reused but other webpage content likely may be updated. For example, a prior version of a newspaper website may have some web content elements in common with a new version, however, some new web content elements, text and images may be needed. In another aspect, the browser assistance server 150 may also provide additional pre-fetching services and may update the content at the browser assistance server 150 and merge the updated content with the cache data. In another aspect, the browser assistance server 150 may pre-compile the cache content and deliver a binary or native code to the browser so the browser can render the webpage.

Figure 13:
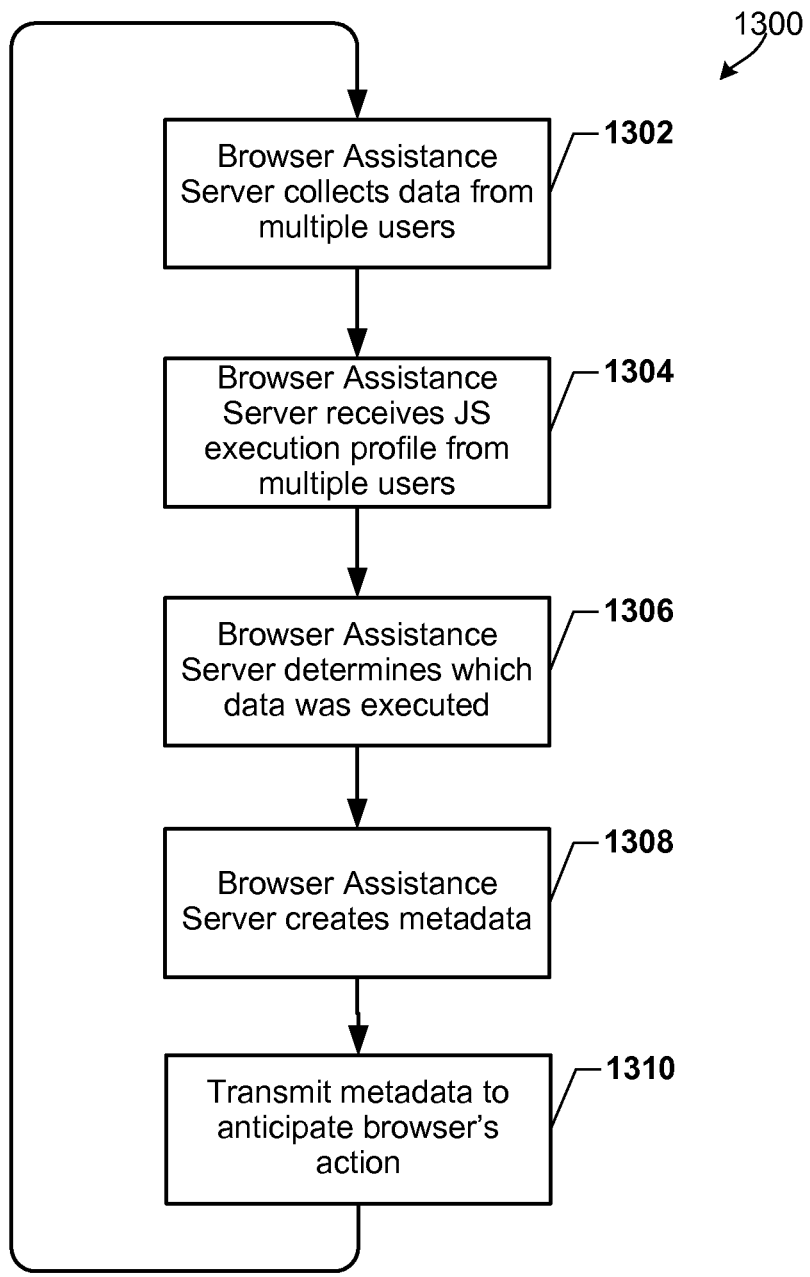
FIG. 13 is a process flow diagram of an aspect method to create metadata of JavaScript execution profiles from multiple users to provide hints to a mobile communication device.

FIG. 13 illustrates an aspect method 1300 for a browser assistance server that creates metadata. The metadata may be based on JavaScript execution profiles. The profiles may be observed from a number of requests and responses from a number of mobile device users. The JavaScript execution profiles may create hints for a computer device that can improve operation of the computer device. The data may comprise functional probabilities that certain JavaScript execution profiles of web elements occur and the frequency of the occurrence. This provides empirical data to base a decision on whether to download and to execute certain JavaScript since if there is a remote chance that a phrase will be accessed, a better choice would be to access data with a high probability of execution.

Method 1300 may be implemented in a computing device having a processor 131 configured with processor-executable instructions to perform the operations of the method 1300. In method 1300, the processor 131 may commence operation at block 1302 by a browser assistance server 150 collecting data of browsing habits for a "crowd" or a number of users.

In block 1304, the processor of the browser assistance server may receive data regarding JavaScript execution profiles from a number of web users. For example, a first JavaScript element may have a first statistical likelihood of being executed while a second JavaScript element may have a second statistical likelihood of being executed that is less than the first by a factor of two based on the observed profile of multiple users. For example, a third JavaScript element may have a third statistical likelihood of being executed that is less than 5 percent while a fourth JavaScript element may have a fourth statistical likelihood of being executed that is less almost 95 percent based on the observed profile of multiple users.

In block 1306, the browser assistance server 150 may examine the first through fourth statistical likelihoods. The browser assistance server 150 may compare the data to a threshold value. In block 1308, the browser assistance server 150 may generate metadata. The metadata may assist the browser to anticipate the user's next browsing activity. The metadata may assist the browser by providing the information pertaining to the likely next activity in advance.

In block 1310, the processor outputs program instructions so the browser assistance server 150 may send metadata to the computer device to assist the computer device and to anticipate the browser's next action. For example, the webpage may comprise the fourth JavaScript element with a high probability of execution based on empirical data observed from other users. The processor may detect that the browser's next step may be to download and process the fourth JavaScript element. The processor may confirm this decision while the third JavaScript element may not be transmitted and processed since it is likely the third JavaScript element will not be executed.

Figure 14:
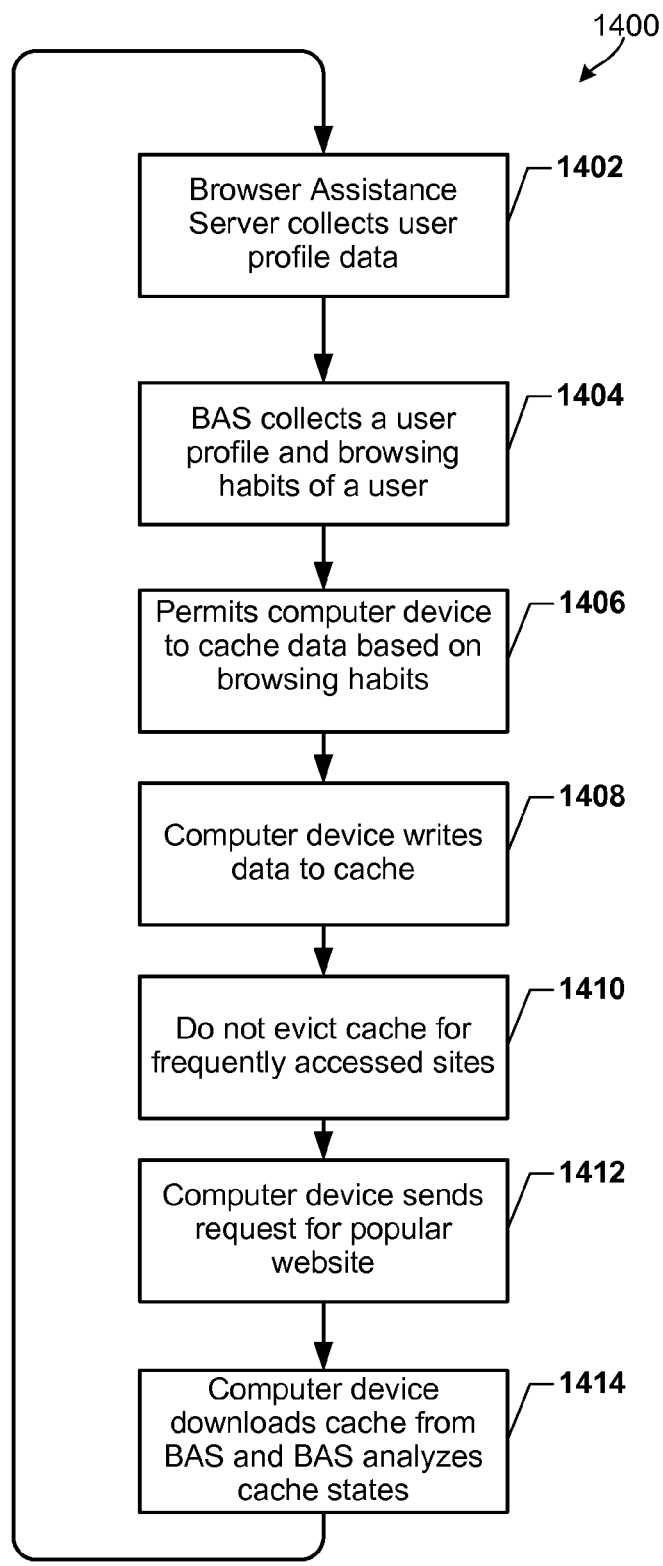
FIG. 14 is a process flow diagram of an aspect method to provide targeted services on behalf of a mobile communication device and to cache popular data and to maintain frequently accessed cached data for a mobile communication device.

FIG. 14 illustrates an aspect method 1400 for a browser assistance server that includes a feature to provide targeted services on behalf of a mobile communication device. The browser assistance server 150 allows mobile communication devices to cache information on the browser assistance server cache memory regarding predetermined websites and may further specify to not evict the cached data on the mobile communication device or on the BAS server 150 based on the user's habits. In this manner, the data may be analyzed for further action. For example, if the web site is frequently accessed as compared to a threshold amount, the browser assistance server 150 may prevent the cache from being overwritten for a predetermined period of time. Thus, the browser assistance server 150 may include a number of different cached states located on the browser assistance server 150.

For example, a website may be frequently accessed by a mobile communication device at 8:00 a.m. and data is written to the mobile device memory. However, a predetermined time later since the memory of the mobile communication device is constrained, the memory can be full, and the data erased in favor of new data associated with a later used website. The next day, the mobile communication device at 8:00 a.m. will visit the predetermined site and need to download the web content elements again. The browser assistance server 150 may detect this behavior and may provide targeted services to the mobile communication device 100 and permit that mobile communication device 100 to write data to a cache memory associated with the browser assistance server 150.

For example, the browser may access the popular website at 8:00 a.m. and data is written to the mobile device memory. However, a predetermined time later since the memory of the mobile communication device is constrained, the memory can be full, and the data is designated to be erased in favor of new data associated with a later used website. Before erasing the data, the mobile communication device 100 will upload the data associated with the website including web site elements to the cache of the BAS server 150. The next day, the mobile communication device before 8:00 a.m. at 5:00 a.m. will download the data from the cache server. At 8:00 a.m., in the event that the user visits the predetermined popular web site, numerous web content elements will already be located on the mobile device memory and the mobile communication device will need to update the website. Further, if this user behavior repeats for a specified period of time, the data on the cache server will not be written over or erased. In this aspect, the browser assistance server 150 can review the cached data for further analysis of user habits.

Method 1400 may be implemented in a computing device having a processor configured with processor-executable instructions to perform the operations of the method 1400. In method 1400, the processor may commence operation at block 1402 by a browser assistance server 150 collecting data from browsing habits for a number of users.

In block 1404, the processor of the browser assistance server may collect information about a user profile and browsing habits of the user. In block 1406, the browser assistance server 150 may provide targeted services. The browser assistance server 150 may permit the computer device to cache data based on the user's browsing habits. In block 1408, the computer device may use a cache memory of the browser assistance server 150 to write data to the cache of popular webpage elements. In block 1410, the popular webpages and webpage elements that are frequently accessed are transmitted to the cache of the browser assistance server 150 for storage and the BAS indicates that the cache data is not to be erased and is marked for further analysis.

In block 1412, the processor of the computing device may send a request for the popular website to render the webpage based on the user's habits. In block 1414, the mobile device processor 131 may read the cache data from the browser assistance server to execute the request. In another aspect, the browser assistance server 150 may also provide additional pre-fetching services and may update the content at the browser assistance server and merge the updated content with the cache data. In another aspect, the browser assistance server 150 may pre-compile the cache content and deliver a binary or native code to the browser so the browser can render the webpage. In block 1414, the browser assistance server may analyze the cache states for further optimization, and pre-fetching. In this aspect, metadata to provide hints for other user may be generated based in part on the analysis in block 1414.

Figure 15:
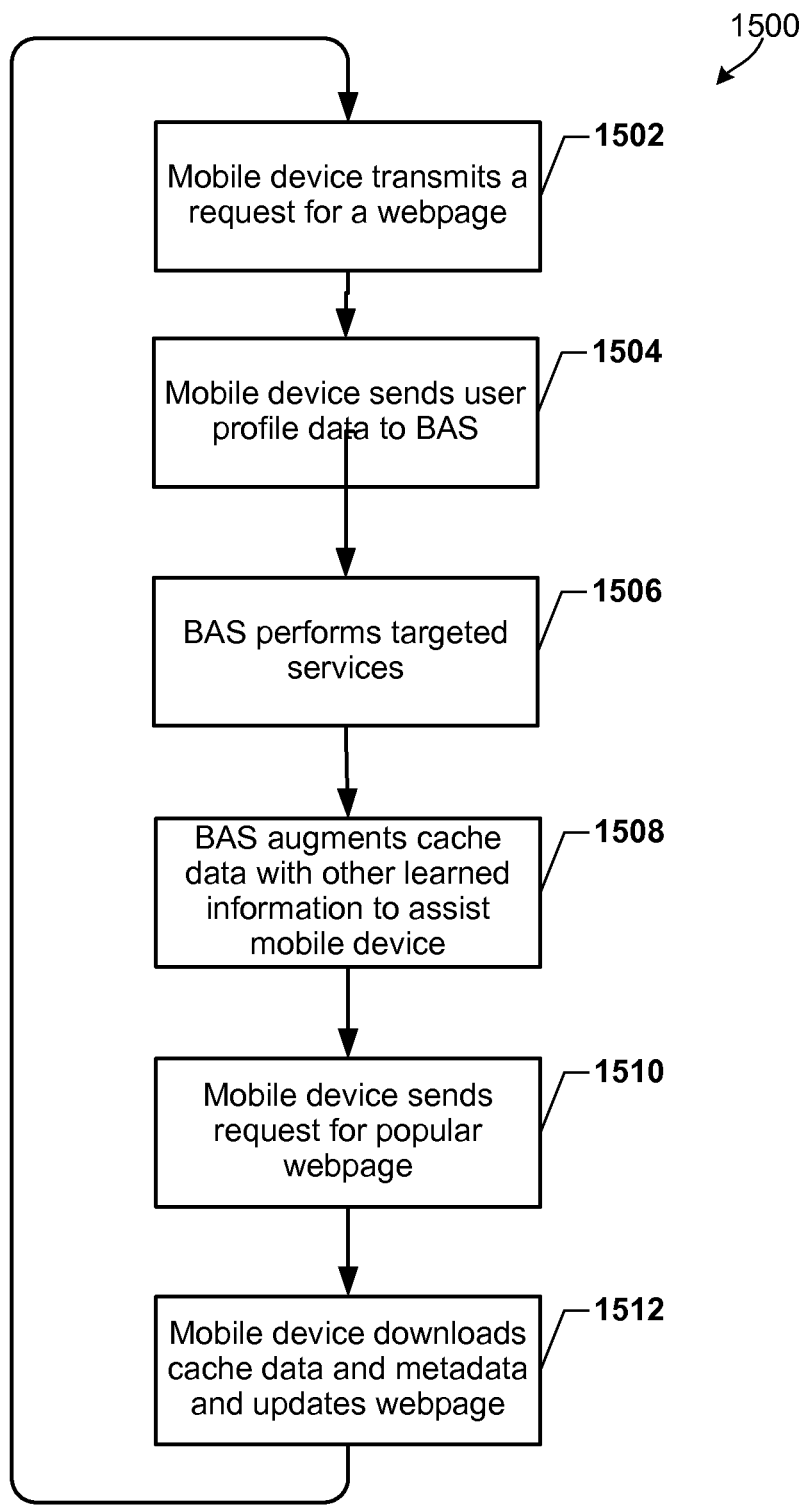
FIG. 15 is a process flow diagram of an aspect method to provide targeted services on behalf of a mobile communication device to cache popular data on a server and to augment the cached data.

FIG. 15 illustrates an aspect method 1500 for a browser assistance server 150 that includes a feature to provide targeted services on behalf of a mobile communication device 100. The browser assistance server 150 allows mobile communication devices 100 to cache information regarding predetermined websites or predetermined web elements. The browser assistance server 150 may further augment cache data and supplement the cache with other data to provide hints to the mobile communication device 100.

For example, a first website may be frequently accessed by a mobile communication device at 8:00 a.m. and data may be written to the mobile device memory. However, a predetermined time later, since the memory of the mobile communication device may be constrained, the memory may be full. The data may be erased in favor of new data associated with a later used second website. The next day, the user may instruct the browser on the mobile communication device at 8:00 a.m. and may visit the first website and may need to download the web content elements again.

The browser assistance server 150 (or the mobile communication device 100) may detect inefficient behavior and may provide targeted services to the mobile communication device 100. The browser assistance server 150 may permit that mobile communication device 100 to write data to a storage medium or cache memory associated with the browser assistance server 150. Additionally, the browser assistance server 150 may augment and supplement the cached data with other learned information or hints. For example, the browser assistance server may provide metadata hints and embed the metadata hints within the cached data. For example, the browser assistance server 150 may pre-compile the cache data and provide the cached data in a binary format (or native format) for the mobile communication device 100.

For example, the browser may access the popular website at 8:00 a.m. and data may be written to the mobile device memory. However, a predetermined time later since the memory of the mobile communication device is constrained, the memory can be full, and the data is designated to be erased in favor of new data associated with a later used website. Before erasing the data, the mobile communication device 100 will upload the data associated with the website including web site elements to the cache of the BAS server 150. The browser assistance server 150 may also optimize the cache data and embed metadata into the cached data. The browser assistance server 150 may provide metadata hints within the cache data for the benefit of the mobile communication device 100.

The next day, the mobile communication device 100 before 8:00 a.m. will download the data from the cache server with the augmented learned data. At 8:00 a.m., in the event that the user visits the predetermined popular web site, numerous web content elements will already be located on the mobile device memory and the mobile communication device 100 may render the page after updating. Further, the mobile communication device 100 may visit a second new website and use the embedded metadata within the downloaded content to parse, execute or analyze new web content.

Method 1500 may be implemented in a computing device having a processor 131 configured with processor-executable instructions to perform the operations of the method 1500. In method 1500, the processor 131 may commence operation at block 1502 where a mobile communication device 100 transmits a request for a webpage.

In block 1504, the processor of the mobile communication device may collect information about a user profile and send the user profile to the browser assistance server 150. In block 1506, the browser assistance server 150 may provide targeted services and may permit the computer device to cache data to a storage medium based on the user's browsing habits. In block 1508, the browser assistance server 150 may augment the cache data with metadata that includes learned information to assist the mobile communication device. In block 1510, the processor of the computing device may send a request for the popular website to render the webpage based on the user's habits. In block 1512, the mobile device processor may download the cache data from the browser assistance server 150 to execute the request and also may optionally download the metadata to assist the browser with current or future browser hints. The same webpage may not be rendered and generally some webpage content may be reused but other webpage content likely may be updated. The browser assistance server 150 may also provide cache data that has undergone optimization.

Figure 16:
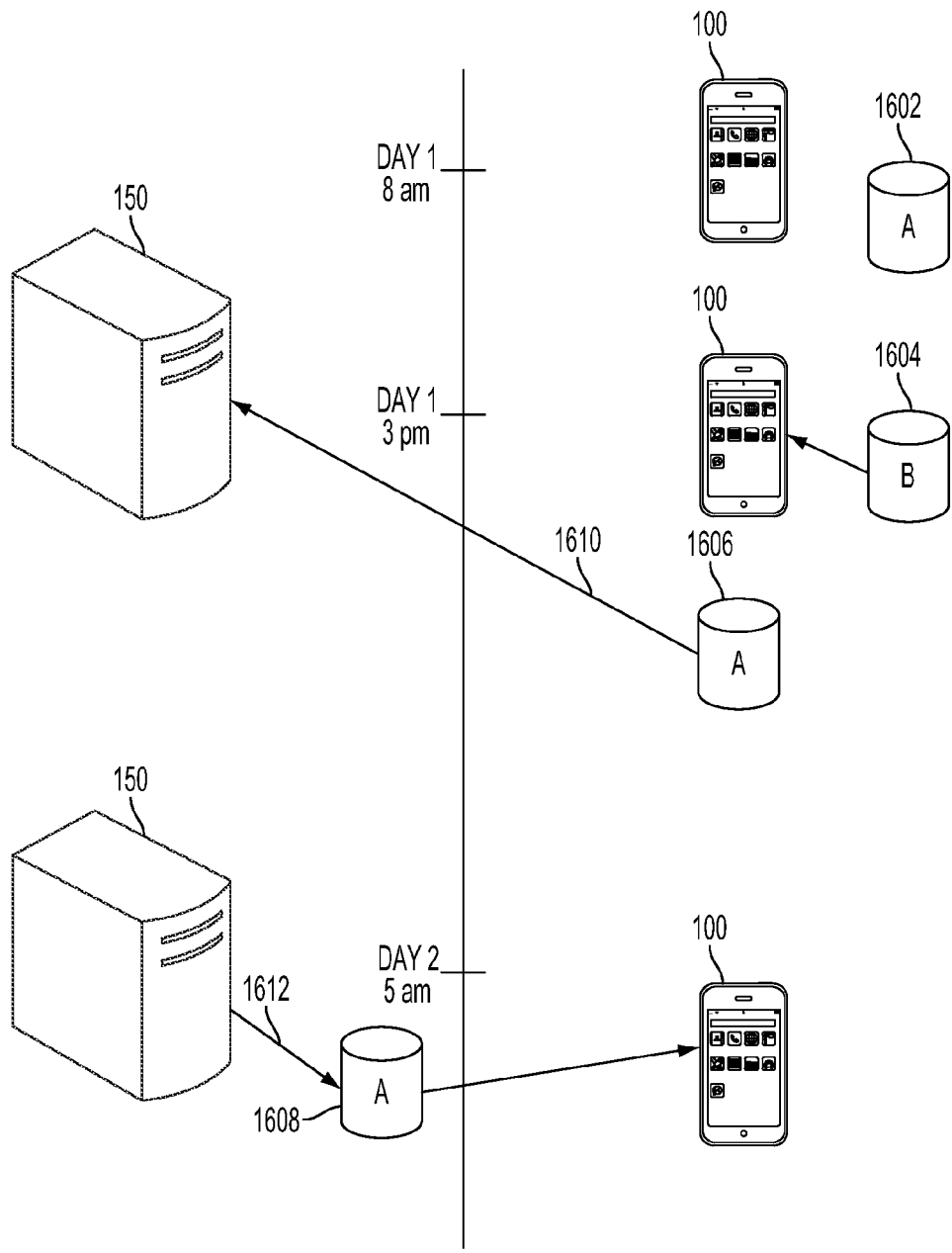
FIG. 16 illustrates a browser assistance server providing frequently used cache data to the mobile communication device.

FIG. 16 shows a high level diagram of a browser assistance server 150 reloading a cache state based on a user's personal profile. For example, on day 1 at 8:00 a.m. a user using a mobile communication device 100 may download a frequently accessed webpage including cache state A 1602. The user may review the web site for a predetermined period of time and may engage several other hyperlinks and deviate from the webpage. At day 1, 3:00 p.m., the user may review a different website having different web content and may generate cache state B 1604. Normally, the cache A 1602 would be deleted. However, the mobile communication device 100 and the browser assistance server 150 are connected via the Internet and the mobile device 100 may use the server 150 as a cache memory. The browser assistance server 150 can provide targeted services for the mobile communication device 100. The browser assistance server 150 may detect that the website (that generated cache state A 1602) is frequently accessed. The website is accessed by the user almost daily at the same time interval of 8:00 a.m.

The browser assistance server 150 will store cache state A 1602 on the server 150 as shown by reference arrow 1610. The mobile communication device 100 can send a request for a different webpage and download data 1604. The browser assistance server 150 may augment the cache data A 1606. The browser assistance server 150 can embed metadata or add data that reflects learned information from the user's browsing habits. Server 150 may embed data from other users to provide hints to the mobile communication device browser 100. On the second day, day 2 at 5:00 a.m., the browser assistance server 150 may push the cache data A 1608 as shown from arrow 1612 from the server 150 to the mobile communication device 100 (along with any updated data contained and saved within the cache data A 1608). For example, on day 2 at 8:00 a.m., a user using a mobile communication device 100 may send a request to download a frequently accessed webpage and may include many web elements contained within cache data A 1608 and may update the web site. The browser assistance server 150 may serve as an L2 cache for the device 100 and can maintain a set of cache states.

Figure 17:
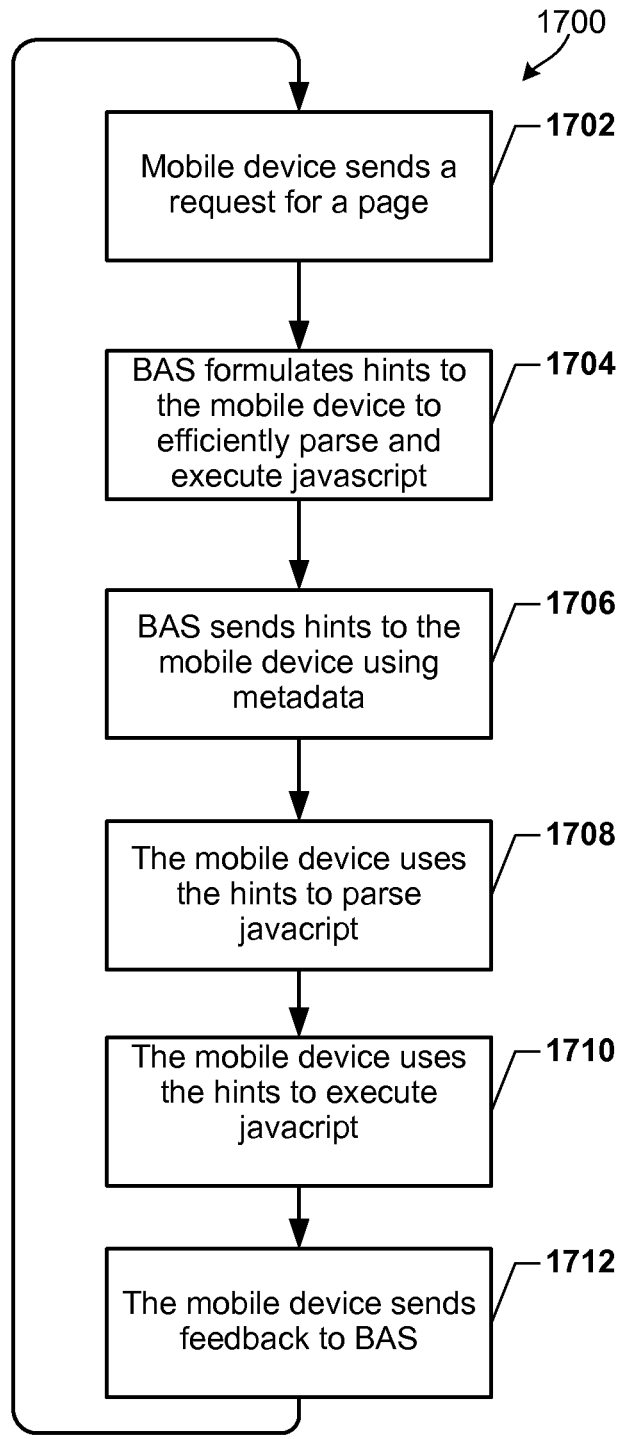
FIG. 17 is a process flow diagram of an aspect method to generate metadata that has hints to parse JavaScript.

FIG. 17 illustrates an aspect method 1700 for a browser assistance server that may provide metadata to efficiently parse and execute JavaScript. Method 1700 may be implemented in a computing device having a processor configured with processor-executable instructions to perform the operations of the method 1700. In method 1700, the processor may commence operation at block 1702 where a mobile communication device transmits a request for a webpage.

In block 1704, the processor of the browser assistance server 150 may formulate hints for the mobile communication device to efficiently parse and to execute JavaScript. For example, the metadata may identify a statistically relevant portion of the script. In block 1706, the browser assistance server may deliver metadata to the mobile communication device that includes hints to efficiently parse and execute JavaScript. In block 1708, the processor may use the metadata to parse the JavaScript. In block 1710, the mobile device processor may use the hints to execute the JavaScript. In block 1712, the mobile device sends feedback to the browser assistance server.

Figure 18:
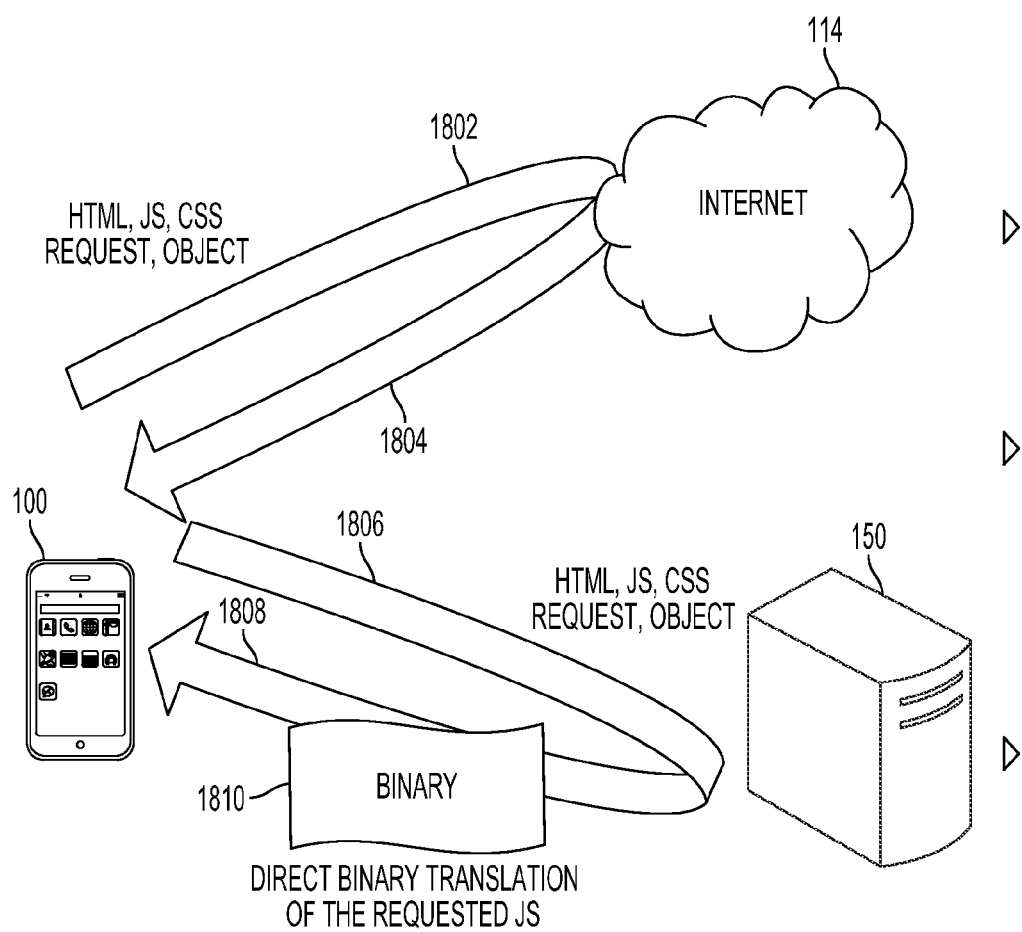
FIG. 18 illustrates a server processing data and sending a precompiled binary file of the processed JavaScript data to the mobile communication device to avoid processing the JavaScript data.

FIG. 18 shows a high level diagram of a browser assistance server 150 detecting that a request for a webpage may include a webpage element that may result in the mobile device processor undergoing an undue amount of processing. The request may result in rendering a webpage in an inefficient manner. In this aspect, the browser assistance server 150 may detect certain webpage elements are present and may pre-compile the webpage elements into binary or a native format of the mobile device 100. The browser assistance server 150 may generate a binary file that corresponds to the webpage element. The browser assistance server 150 may transmit the binary file to the mobile communication device 100 for a faster load time.

For example, at 8:00 a.m. a user using a mobile communication device 100 may seek to download a webpage by sending a request 1802 to the Internet 114. The request may be received by a server (not shown) and the response request may potentially return data 1804 that includes HTML, JavaScript, CSS, and objects. The mobile communication device 100 may also send a request 1806 to a browser assistance server 150. The request 1806 may determine whether the browser assistance server 150 can provide hints to more efficiently parse and execute HTML, JavaScript, CSS and objects.

In addition to the hints, the browser assistance server 150 can also directly analyze and pre-compile JavaScript for a predetermined architecture. The browser assistance server 150 may process the JavaScript and may generate a direct binary pre-compiled translation of the requested JavaScript web elements 1810. The direct binary translation of the requested JavaScript web elements 1810 can be transmitted to the mobile communication device 100 as shown by arrow 1808 for immediate use by the mobile communication device 100 browser. The precompiled binary 1810 allows the mobile communication device 100 to avoid parsing, analyzing and just-in-time processing associated with the JavaScript execution path. The mobile device 100 may optionally provide feedback to the browser assistance server 150. In an alternative aspect, the browser assistance server may provide a virtualized module on the mobile device 100 and deliver data to the virtualized module.

Figure 19:
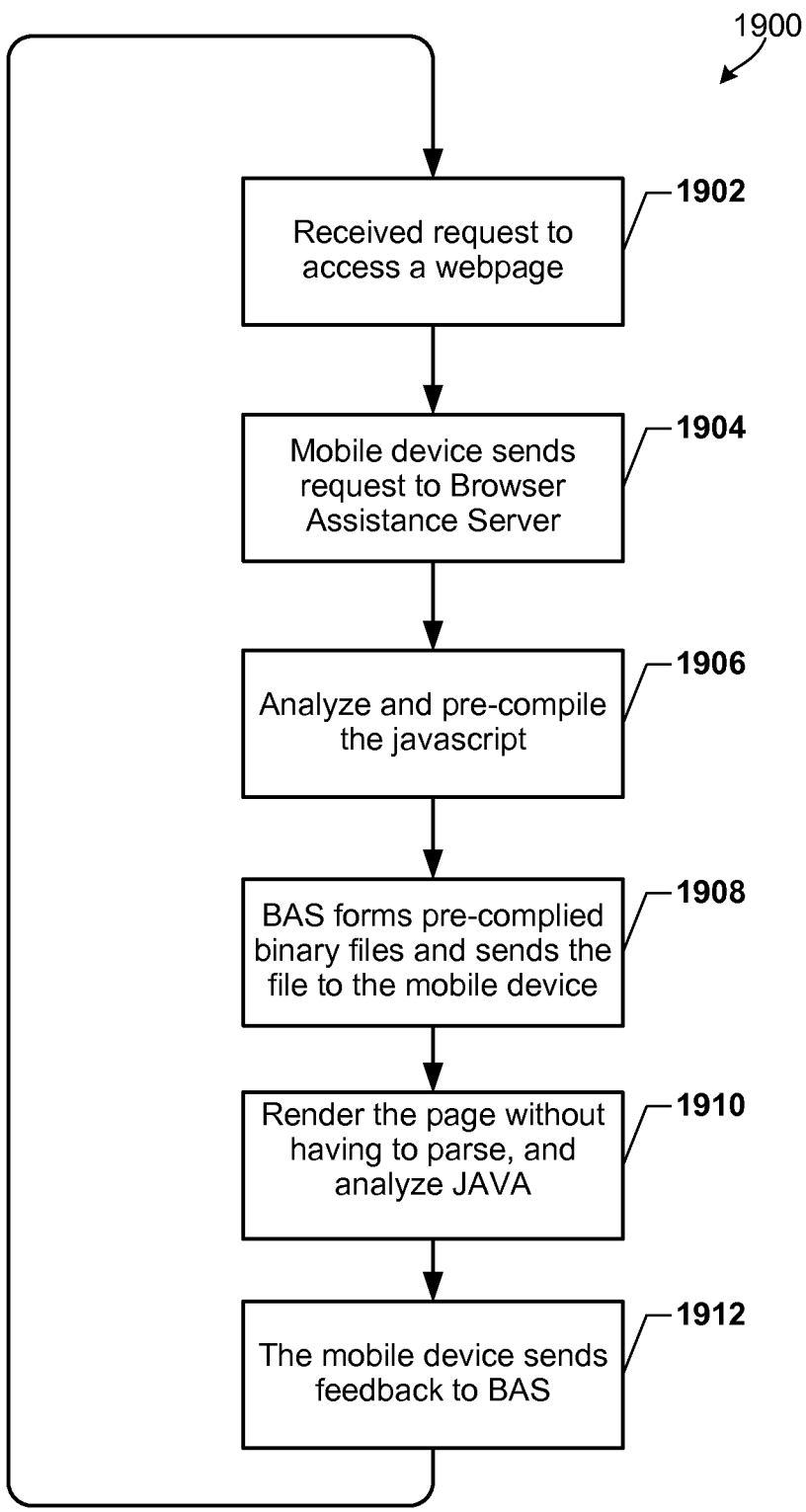
FIG. 19 is a process flow diagram of an aspect method to process data at a server and to provide a precompiled binary file of the processed data to the mobile communication device to avoid processing the data locally.

FIG. 19 illustrates an aspect method 1900 for a browser assistance server that detects JavaScript elements and provides a direct binary translation of the requested JavaScript web elements to form the precompiled binary or native file. The direct binary translation is transmitted to the mobile communication device 100 for immediate use by the mobile communication device browser. Method 1900 may be implemented in a computing device having a processor 131 configured with processor-executable instructions to perform the operations of the method 1900. In method 1900, the processor 131 may commence operation at block 1902 where a mobile communication device 100 transmits a request for a webpage.

In block 1904, the processor of the mobile communication device may send a request to a browser assistance server 150 to efficiently parse and to execute JavaScript. In block 1906, the browser assistance server 150 may analyze the request and pre-compile the webpage JavaScript for the mobile communication device 100. In block 1908, the browser assistance server 150 may form at least one pre-compiled binary file and may transmit the pre-complied binary file to the mobile device processor 131. The direct binary translation may be transmitted to the mobile communication device 100 for immediate use by the mobile communication device browser. Alternatively, the translation may be in another native language associated with the mobile communication device browser. The native language allows the mobile communication device to avoid parsing, analyzing and just-in-time processing of a JavaScript execution path. In block 1910, the mobile device processor 131 may use the pre-complied data to render the webpage. In block 1912, the mobile device may optionally send feedback to the browser assistance server.

Figure 20:
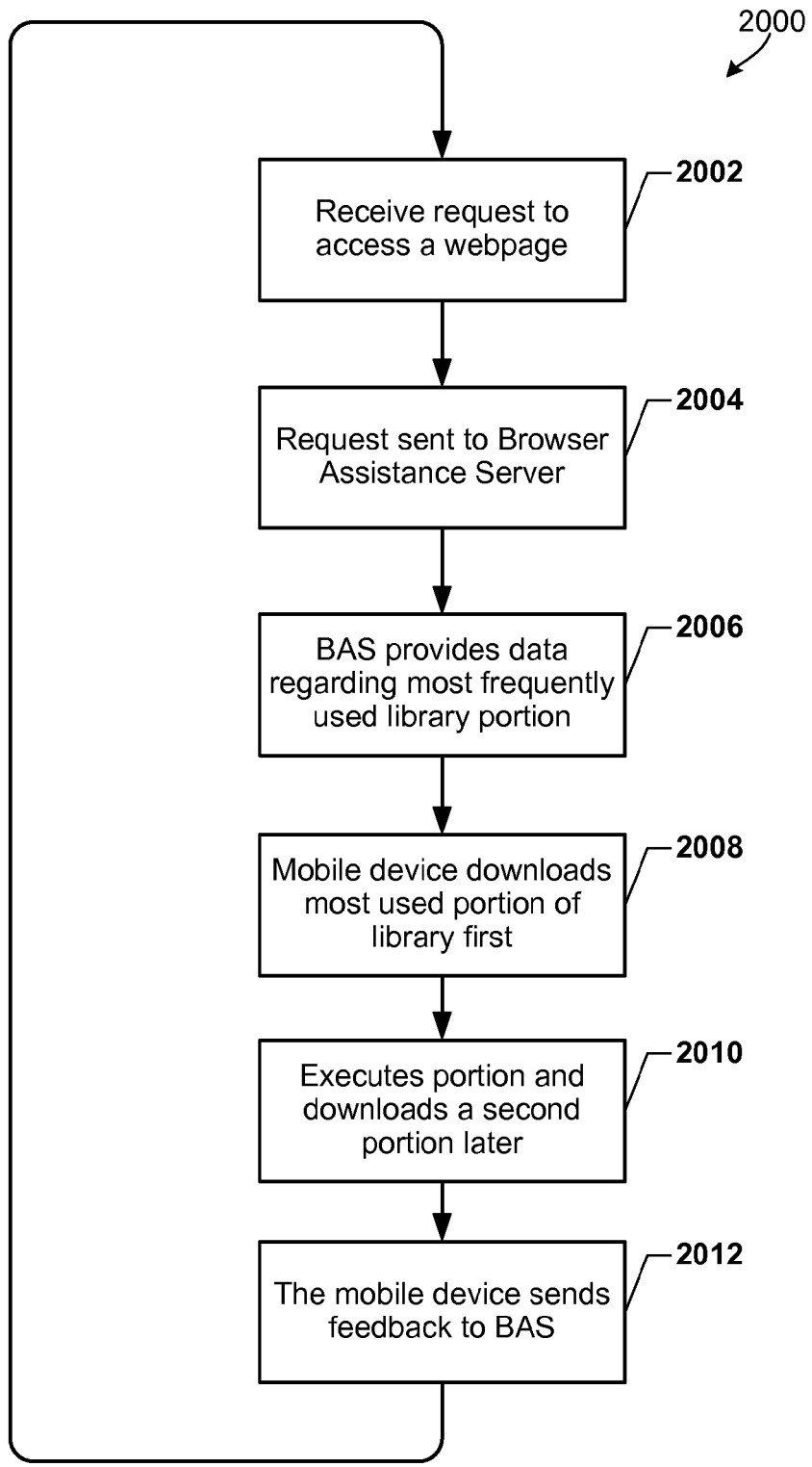
FIG. 20 is a process flow diagram of an aspect method to provide metadata identifying a most frequently used library portion so the mobile communication device can download a most frequently used library portion without downloading the entire software library.

FIG. 20 illustrates an aspect method 2000 for a browser assistance server that detects a library is requested. The library can be a YUI library or a jQuery library or any library known in the art. YUI is a library of JavaScript utilities and controls for building richly interactive web applications using techniques such as DOM Scripting, DHTML, and Ajax. jQuery is a fast and concise JavaScript library that simplifies HTML document traversing, event handling, animating and Ajax interactions for rapid web development and which is CSS3 compliant.

The browser assistance server 150 may provide metadata that a first library portion is more frequently executed while a second library portion is less frequently executed. In this manner, the processor 131 may download a first library portion that may a higher statistical chance of use relative to a second library portion that likely may not be executed. In other aspect, if the assumptions are incorrect, the browser may send the fill library as soon as practicable. Method 2000 may be implemented in a computing device having a processor 131 configured with processor-executable instructions to perform the operations of the method 2000. In method 2000, the processor may commence operation at block 2002 where a mobile communication device may transmit a request for a webpage, which is received by a server.

In block 2004, the processor of the mobile communication device may send a request to a browser assistance server to obtain hints for the mobile communication device and to process the request. The browser assistance server may analyze the request and in block 2006, the processor may provide data regarding a most frequently used or most frequently executed portion of a library to the mobile communication device. The browser assistance server may also optionally provide information about the least frequently used or the least frequently executed library portions. In block 2008, the mobile device processor may download the most frequently used (or the most frequently executed library portion) first and may download other portions later in time. In block 2010, the mobile device processor may execute the portion and may download a second portion of the library at a time later, if at all. In block 2012, the mobile device may optionally transmit feedback to the browser assistance server.

Figure 21:
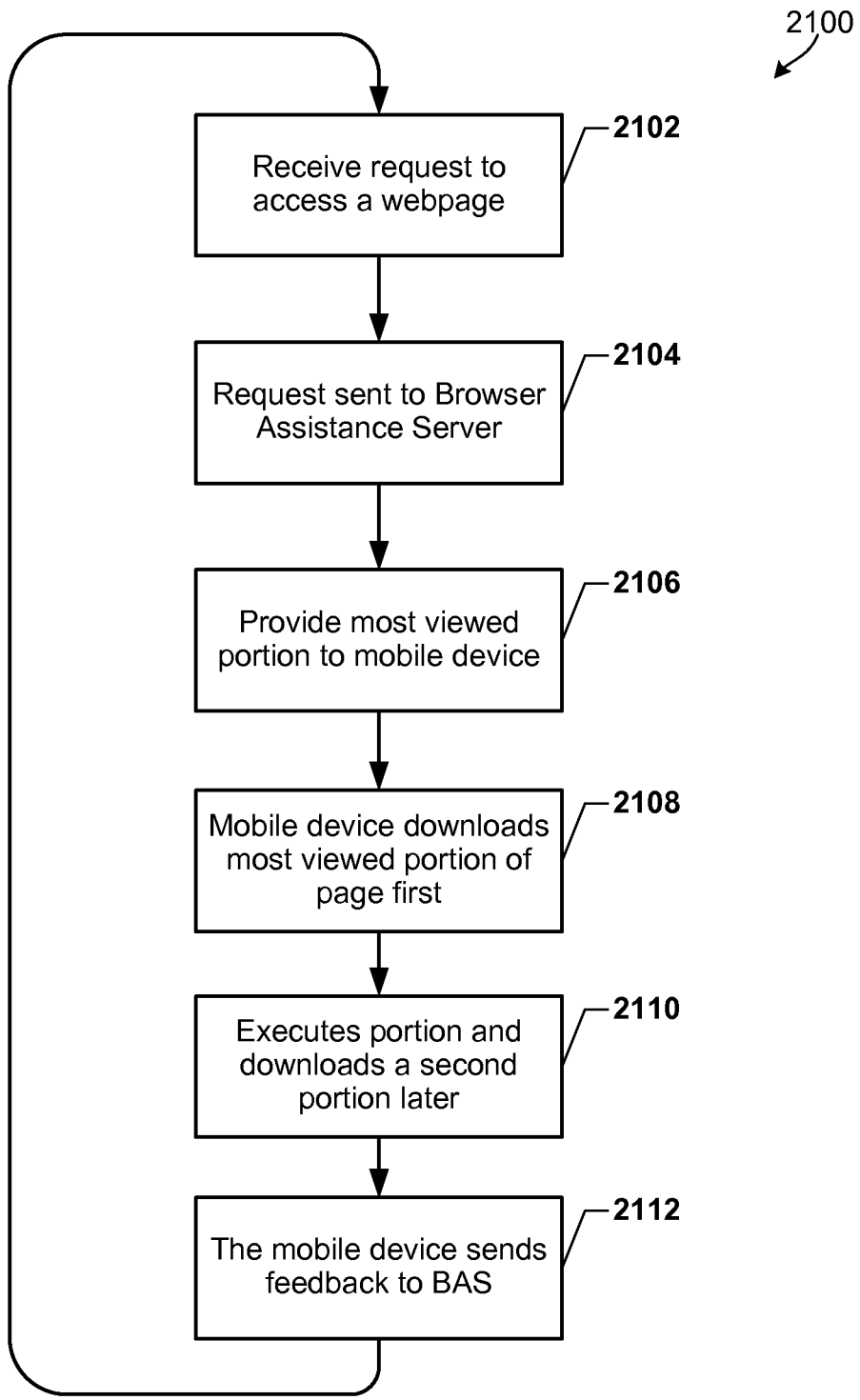
FIG. 21 is a process flow diagram of an aspect method to provide metadata of a most viewed webpage portion so the mobile communication device can download a most viewed portion before another portion.

FIG. 21 illustrates an aspect method 2100 for a browser assistance server 150 that may detect and may provide hints of a most viewed portion of a webpage based on empirical data. The browser assistance server 150 provides metadata to a mobile device processor 131 so the mobile communication device can process the webpage in a more efficient manner Method 2100 may be implemented in a computing device having a processor 131 configured with processor-executable instructions to perform the operations of the method 2100. In method 2100, the processor may commence operation at block 2102 where a mobile communication device transmits a request for a webpage, which is received by a server.

In block 2104, the processor 131 of the mobile communication device 100 may send a request to a browser assistance server 150 to obtain hints for the mobile communication device 100 and to process the request. The hints are contained in metadata sent from the server 150 to the mobile communication device 100. The browser assistance server 150 may analyze the request. In block 2106, the processor 131 may provide data regarding a most frequently viewed webpage portion for a website to the mobile communication device 100.

The browser assistance server 150 may derive this information from empirical or statistics observed from a number of users. The browser assistance server 150 may also optionally provide information about the least viewed portion of the website. In block 2108, the mobile device processor 131 may download the most frequently viewed website portion first and may download other portions later in time in block 2110. In block 2110, the mobile device processor 131 may execute the portion and download a second portion later. In block 2112, the mobile device 100 may send feedback to the browser assistance server 150.

Figure 22:
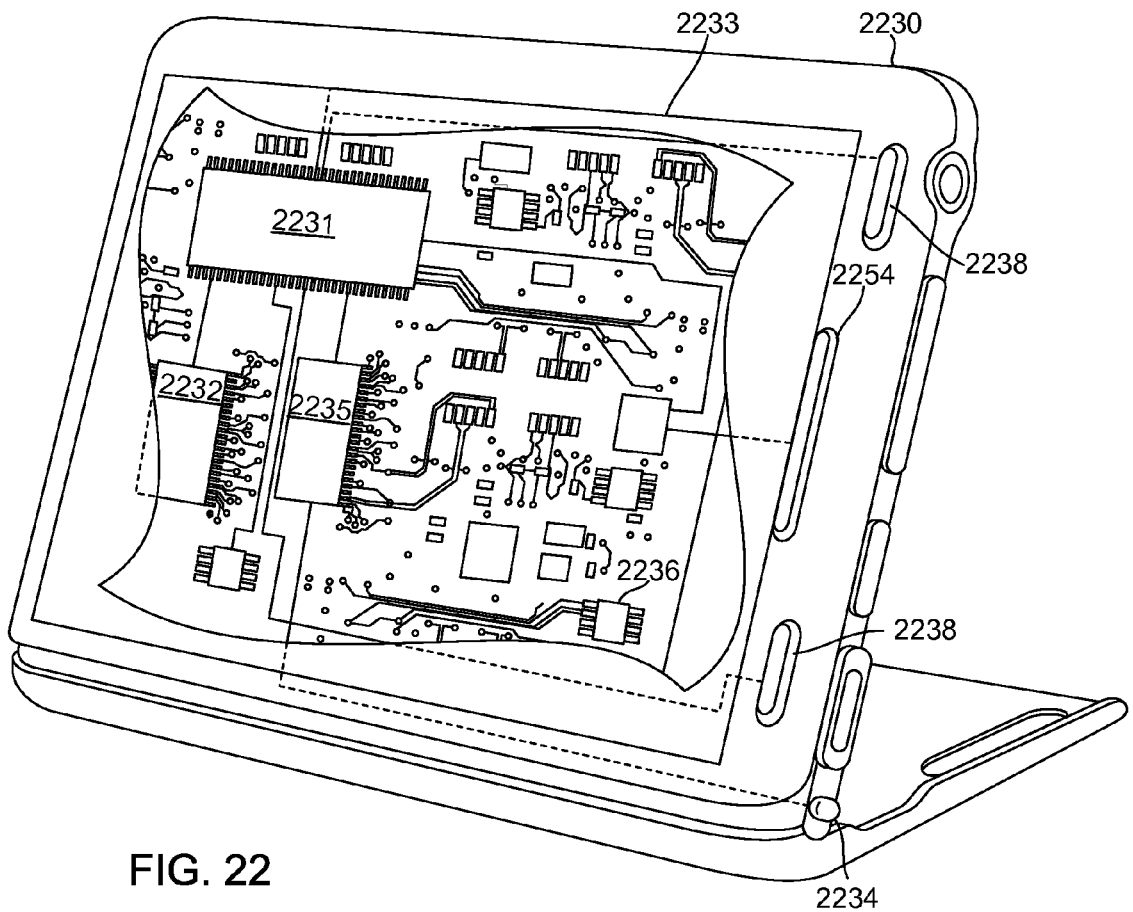
FIG. 22 is a component block diagram of a mobile computing device suitable for use with the various aspects.

FIG. 22 is a system block diagram of a receiver device suitable for use with any of the aspects. A typical receiver device 2230 may include a processor 2231 coupled to internal memory 2232, a display 2233, and to a speaker 2254. Additionally, the receiver device may include an antenna 2234 for sending and receiving electromagnetic radiation that may be connected to a wireless data link and/or cellular telephone transceiver 2235 coupled to the processor 2231 and a mobile multimedia broadcast receiver 2236 coupled to the processor 2231. Receiver devices 2230 typically also include menu selection buttons or rocker switches 2238 for receiving user inputs.

Figure 23:
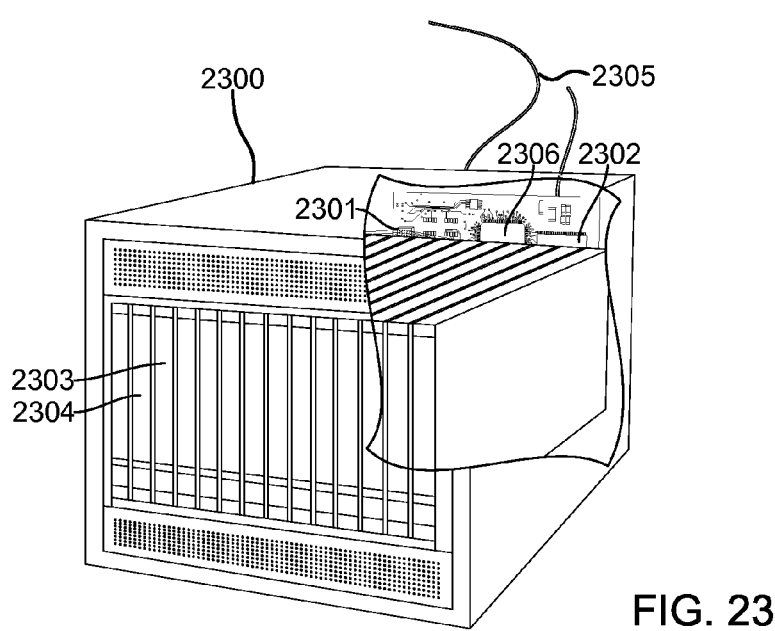
FIG. 23 is a component block diagram of a server computing device.

The various aspects may be implemented on any of a variety of commercially available server devices, such as the server 2300 illustrated in FIG. 23. Such a server 2300 typically includes a processor 2301 coupled to volatile memory 2302 and a large capacity nonvolatile memory, such as a disk drive 2303. The server 2300 may also include a floppy disc drive, compact disc (CD) or DVD disc drive 2306 coupled to the processor 2301. The server 2300 may also include network access ports 2304 coupled to the processor 2301 for establishing network interface connections with a network 2305, such as a local area network coupled to other broadcast system computers and servers.

The processors 2231, 2301 may be any programmable microprocessor, microcomputer or multiple processor chip or chips that can be configured by software instructions (applications) to perform a variety of functions, including the functions of the various aspects described above. In some devices, multiple processors 2231, 2301 may be provided, such as one processor dedicated to wireless communication functions and one processor dedicated to running other applications. Typically, software applications may be stored in the internal memory 2232, 2302, and 2303 before they are accessed and loaded into the processor 2231, 2301. The processor 2231, 2301 may include internal memory sufficient to store the application software instructions. In many devices the internal memory may be a volatile or nonvolatile memory, such as flash memory, or a mixture of both. For the purposes of this description, a general reference to memory refers to memory accessible by the processor 2231, 2301 including internal memory or removable memory plugged into the device and memory within the processor 2231, 2301 itself.

Figure 24:
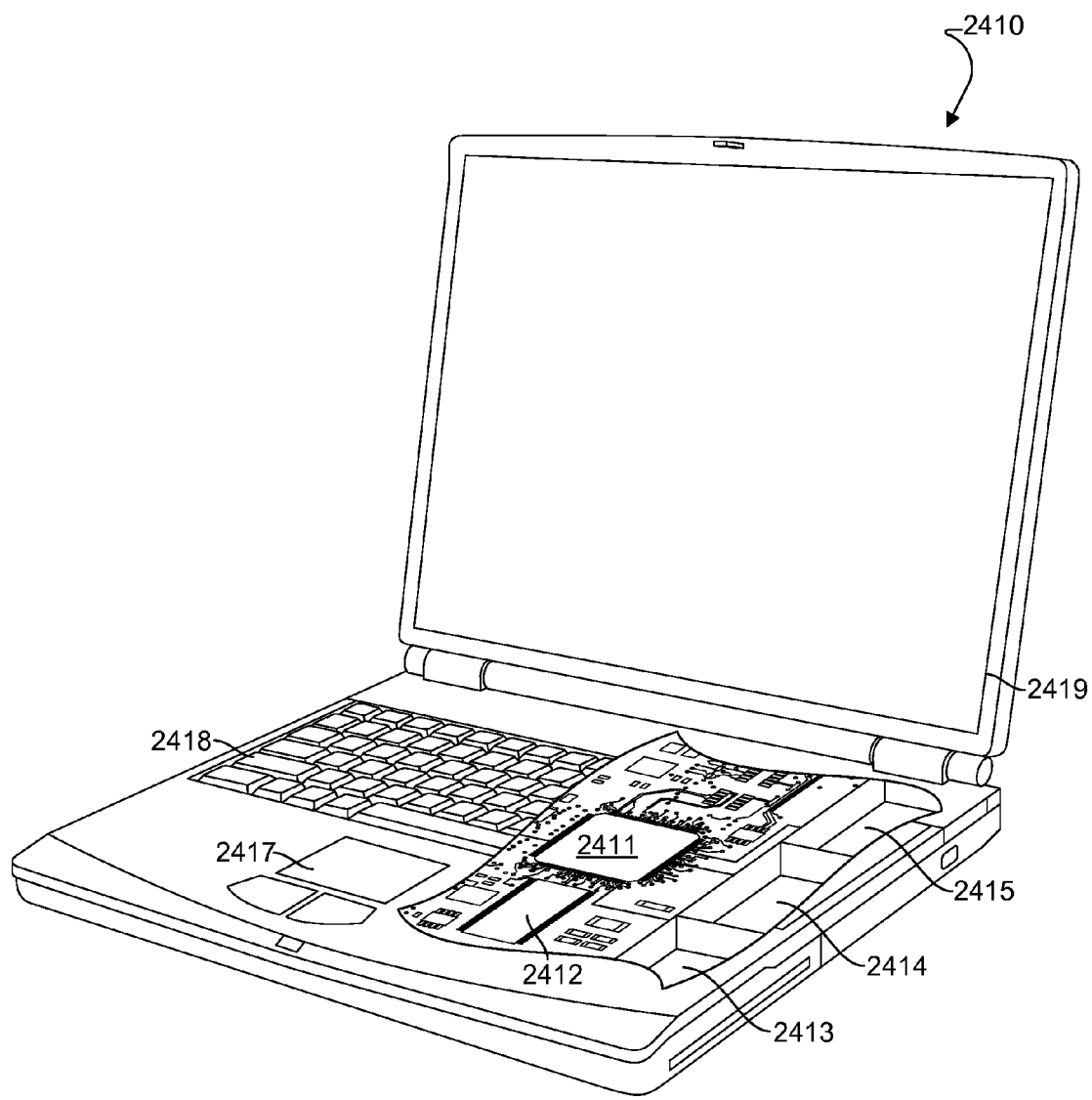
FIG. 24 is a component block diagram of a notebook computing device.

FIG. 24 shows a laptop computer 2410. The aspects described above may also be implemented within a variety of personal computing devices, such as a laptop computer 2410 as illustrated in FIG. 24. Many laptop computers include a touch pad touch surface 2417 that serves as the computer's pointing device, and thus may receive drag, scroll, and flick gestures similar to those implemented on mobile computing devices equipped with a touch screen display and described above. A laptop computer 2410 will typically include a processor 2411 coupled to volatile memory 2412 and a large capacity nonvolatile memory, such as a disk drive 2413 of Flash memory. The computer 2410 may also include a floppy disc drive 2414 and a compact disc (CD) drive 2415 coupled to the processor 2411. The computer device 2410 may also include a number of connector ports coupled to the processor 2411 for establishing data connections or receiving external memory devices, such as a USB or FireWire® connector sockets, or other network connection circuits for coupling the processor 2411 to a network. In a notebook configuration, the computer housing includes the touchpad 2417, the keyboard 2418, and the display 2419 all coupled to the processor 2411. Other configurations of computing device may include a computer mouse or trackball coupled to the processor (e.g., via a USB input) as are well known, which may also be use in conjunction with the various aspects.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable or processor-readable storage medium. The steps of a method or algorithm disclosed herein may be embodied in a processor-executable software module executed which may reside on a non-transitory computer-readable medium. Non-transitory computer-readable and processor media include any available storage media that may be accessed by a computer or processor. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method for rendering a webpage on a computing device, comprising:
    transmitting a request for a webpage from the computing device;
    transmitting a request from the computing device for metadata regarding the requested webpage to a browser assistance server;
    receiving the metadata from the browser assistance server in the computing device to assist the computing device in parsing, analyzing, or executing the requested webpage, wherein the metadata describes that a library of the webpage includes a portion that is determined most likely to be executed based on statistical observed browsing patterns observed from a plurality of peer computing devices;
    downloading the library portion most likely to be executed before other portions of the library based on the received metadata;
    executing the downloaded library portion of the requested webpage on the computing device to render the requested webpage; and
    sending results from processing and rendering the requested webpage to the browser assistance server to provide feedback of a quality of service of the metadata.

2. The method of claim 1, wherein the metadata received in the computing device comprises data selected from the group consisting of:
    JavaScript function execution probabilities;
    AST data for parsing data;
    script token data;
    lexing information;
    returned binary code from data processed at a server to assist the computing device;
    CSS metadata to assist in processing CSS webpage data at the computing device;
    JavaScript metadata to assist in processing JavaScript webpage data at the computing device;
    HTML metadata to assist in processing HTML webpage data at the computing device;
    and combinations thereof.

3. The method of claim 1, further comprising using the metadata to assist in loading portions of the webpage at the computing device before other portions.

4. The method of claim 1, wherein the metadata received in the computing device comprises statistics regarding a portion of code that has a predetermined probability of execution.

5. The method of claim 1, wherein the metadata received in the computing device comprises translated binary code resulting from JavaScript code executed on a server to increase processing at the server and reduce processing at the computing device.

6. The method of claim 1, wherein the metadata received in the computing device comprises analytics that correlate to portions of the webpage that are popular and cause a web browser on the computing device to load the popular portions first.

7. The method of claim 1, further comprising:
    gathering habits of a user of the computing device; and
    preloading into memory webpage elements frequently accessed by the user.

8. The method of claim 1, further comprising:
    gathering in a server usage information from the plurality of peer computing devices corresponding to popular data of the plurality of peer computing devices; and
    generating metadata based on the usage information and an analysis of habits of the plurality of peer computing devices.

9. The method of claim 1, further comprising:
    receiving metadata from a local network computer in the computing device based upon the local network computer gathering usage information from the plurality of peer computing devices corresponding to popular data of peer computing devices; and
    generating additional metadata based on the gathered usage information.

10. The method of claim 1, further comprising:
    gathering aggregate information on browsing habits based on the plurality of peer computing devices as the peer computing devices use a web browser;
    monitoring the plurality of peer computing devices to generate the browsing habits using an instrumented web browser; and
    generating metadata based on the browsing habits of the plurality of peer computing devices.

11. The method of claim 1, further comprising:
receiving metadata indicating a library is frequently downloaded;
wherein the metadata describes a portion of the library that is statistically likely to be needed before other portions for execution based on observed statistical information; and
downloading the portion of the library first based on the metadata.

12. The method of claim 11, further comprising:
downloading the most likely executable library portion first before other portions of the library.

13. The method of claim 1, further comprising:
monitoring the plurality of peer computing devices during browsing;
generating metadata indicating a statistical percentage of the peer computing devices that are likely to view a first portion of a webpage before other portions; and
transmitting the first portion first to the computing device before other portions of the webpage.

14. The method of claim 1, wherein the metadata comprises a profile for a user of the computing device, the method further comprising:
receiving metadata indicating a statistical percentage that the user is likely to view a first portion of a webpage before other portions based on the profile;
receiving metadata indicating a statistical percentage that the user is not likely to view a second portion of a webpage;
downloading the first portion first to the computing device before other portions of the webpage; and
downloading the second portion a time period after the first portion.

15. The method of claim 1, further comprising:
receiving metadata indicating browsing habits of the peer computing devices;
determining which portions of webpages are statistically likely to be accessed before other portions of the webpage based on the metadata;
determining that a second portion is likely not accessed frequently; and
downloading the second portion lower in priority than portions statistically likely to be accessed.

16. The method of claim 1, further comprising:
providing hints using the metadata for a web browser to parse, analyze or execute the request that comprises JavaScript; and
receiving a binary pre-compiled translation of the JavaScript upon a determination that the JavaScript is inefficient to process in the computing device.

17. The method of claim 1, further comprising:
sending browsing data from an Internet browser to a server; and
generating the metadata from the browser data in the server.

18. The method of claim 1, further comprising:
sending data from an instrumental browser to a server; and
generating the metadata from the data.

19. The method of claim 1, further comprising:
generating additional metadata from browsing habits that comprise requests and responses to requests; and
providing the additional metadata to one of the peer computing devices.

20. The method of claim 1, further comprising:
monitoring browsing habits of the plurality of peer computing devices;
sending the browsing habits to a server;
formulating a plurality of observed profiles of the plurality of peer computing devices based on the monitored browsing habits;
monitoring the browsing habits of a computing device user; and
receiving metadata from the server at the computing device based on at least one observed profile that matches the computing device user based on the monitored browsing habits.

21. The method of claim 1, further comprising:
describing in the metadata that a portion of code is at least one of analyzed, downloaded, parsed, or executed more often than a second portion; and
reordering and downloading the portion of code first before the second portion.

22. The method of claim 1, further comprising:
transmitting the request for the browser assistance server that is located on a server;
determining that a web site is frequently accessed by the computing device; and
uploading updated web site data to the computing device.

23. The method of claim 1, further comprising:
downloading first portions of webpages using the computing device before second portions based on statistical browsing habits contained in the metadata.

24. The method of claim 1, further comprising:
preloading portions of webpages using the computing device with the preloaded portions being identified using statistical browsing habits contained in the metadata.

25. The method of claim 1, further comprising:
monitoring browsing habits from the plurality of peer computing devices;
determining that a webpage comprising webpage elements is frequently accessed;
storing webpage elements on a cache based on the browsing habits to prevent the webpage elements from being deleted on the computing device; and
downloading the webpage elements from the cache before an anticipated request.

26. The method of claim 25, further comprising:
monitoring browsing habits that are derived from a single user's browsing habits;
updating the webpage stored on the cache;
pushing elements on the cache to the computing device at periodic intervals without the request;
updating the webpage stored on the cache; and
pulling elements on the cache to the computing device.

27. The method of claim 1, further comprising:
receiving in the computing device metadata that allows the computing device to execute the webpage in a more efficient manner by executing necessary portions; and
forgoing executing an entire webpage.

28. The method of claim 1, further comprising transmitting the request to the browser assistance server at a location selected from the group consisting of a server that is the same server that responds to the request for the webpage, a peer computer device, and a network device.

29. The method of claim 1, further comprising:
transmitting a request for data;
transmitting a request to a first device;
transmitting metadata to a second device; and
describing portions of the webpage in the metadata that have a likely statistical chance of execution based on monitored empirical data of requests and responses to requests.

30. The method of claim 1, further comprising receiving metadata in the computing device in advance by pre-caching the metadata to assist the computing device in parsing, analyzing, or executing the requested webpage.

31. A method for rendering a webpage on a computing device, comprising:
   transmitting a request for a webpage from the computing device;
   transmitting a request from the computing device for metadata regarding the requested webpage to a browser assistance server;
   receiving the metadata from the browser assistance server in the computing device to assist the computing device in parsing, analyzing, or executing the requested webpage, wherein the browser assistance server aggregates statistics regarding a plurality of web users browsing habits to determine portions of the webpage that are popular and delivers the statistics in the metadata;
   using the statistics to conserve mobile resources by pre-loading statistically popular webpages before the webpages are requested at the computing device;
   downloading the portions of the webpage that are popular; and
   omitting downloading second portions of the webpage that are not popular to conserve mobile resources.

32. A method for rendering a webpage on a computing device, comprising:
   transmitting a request for a webpage from the computing device;
   transmitting a request from the computing device for metadata regarding the requested webpage to a browser assistance server; and
   receiving the metadata from the browser assistance server in the computing device to assist the computing device in parsing, analyzing, or executing the requested webpage, wherein the metadata received in the computing device further comprises metadata from a peer device to the computing device that correlates to portions of the webpage that are popular with computing devices connected to the peer device based on statistical observed browsing patterns observed from the computing devices connected to the peer device so a web browser on the computing device loads the popular portions first.

33. A method for rendering a webpage on a computing device, comprising:
   transmitting a request for a webpage from the computing device;
   transmitting a request from the computing device for metadata regarding the requested webpage to a browser assistance server;
   receiving the metadata from the browser assistance server in the computing device to assist the computing device in parsing, analyzing, or executing the requested the webpage, wherein the metadata describes a portion of the webpage that is most likely to be executed based on statistical observed browsing patterns observed from a plurality of peer computing devices;
   providing a client side monitoring system of browsing habits of a second computing device;
   sending the browsing habits to a server; and
   receiving further metadata from the server in the computing device based on the client side monitoring system of the browsing habits of the second computing device.

34. A method for rendering a webpage on a computing device, comprising:
   transmitting a request for a webpage from the computing device, wherein the webpage includes portions comprising JavaScript;
   transmitting a request from the computing device for metadata regarding the requested webpage to a browser assistance server;
   processing the portions using the browser assistance server to result in native code;
   receiving the metadata comprising the native code from the browser assistance server in the computing device to assist the computing device in executing the requested webpage, wherein the metadata describes a portion of the webpage that is most likely to be executed based on statistical observed browsing patterns observed from a plurality of peer computing devices;
   executing code of the requested webpage on the computing device to render the requested webpage; and
   sending results from processing and rendering the requested webpage to the browser assistance server to provide feedback;
   wherein the browser assistance server is located on one of a server, a network computer, or a peer device.

35. A computing device, comprising:
   a display;
   an internal memory; and
   a processor coupled to the display and the internal memory, wherein the processor is configured with processor-executable instructions to perform operations comprising:
      transmitting a request for a webpage;
      transmitting a request for metadata regarding the requested webpage to a browser assistance server;
      receiving the metadata from the browser assistance server to assist the computing device in parsing, analyzing, or executing the requested webpage, wherein the metadata indicates that a library includes a portion of the webpage that is determined most likely to be executed based on statistical observed browsing patterns observed from a plurality of peer computing devices;
      downloading the library portion most likely to be executed before other portions of the library based on the received metadata;
      executing the downloaded library portion of the requested webpage on the computing device to render the requested webpage; and
      sending results from processing and rendering the requested webpage to the browser assistance server to provide feedback.

36. The computing device of claim 35, wherein the processor is configured with processor-executable instructions to perform operations such that receiving metadata comprises receiving data selected from the group consisting of:
   JavaScript function execution probabilities;
   AST data for parsing data;
   script token data;
   lexing information;
   returned binary code from data processed at a server to assist the computing device;
   CSS metadata to assist in processing CSS webpage data at the computing device;
   JavaScript metadata to assist in processing JavaScript webpage data at the computing device;
   HTML metadata to assist in processing HTML webpage data at the computing device; and
   combinations thereof.

37. The computing device of claim 35, wherein:
the processor is configured with processor-executable instructions to perform operations such that receiving metadata comprises receiving a plurality of observed users browsing statistics; and
further comprising using the metadata to assist in loading portions of the webpage before other portions.

38. The computing device of claim 35, wherein the processor is configured with processor-executable instructions to perform operations such that receiving metadata comprises receiving statistics regarding a portion of code that has a predetermined probability of execution.

39. The computing device of claim 35, wherein the processor is configured with processor-executable instructions to perform operations further comprising:
receiving metadata that comprises translated binary code resulting from JavaScript code executed on a server to increase processing at the server and reduce processing at the computing device.

40. The computing device of claim 35, wherein the processor is configured with processor-executable instructions to perform operations such that receiving metadata comprises receiving analytics that correlate to portions of the webpage that are popular so a web browser on the computing device loads the popular portions first.

41. The computing device of claim 35, wherein the processor is configured with processor-executable instructions to perform operations further comprising:
monitoring web browsing habits of a user of the computing device;
sending information regarding the user web browsing habits to a server; and
receiving metadata from the server based in part on the user web browsing habits.

42. The computing device of claim 35, wherein the processor is configured with processor-executable instructions to perform operations further comprising:
monitoring web browsing habits of a user of the computing device; and
preloading into memory webpage elements frequently accessed by the user.

43. The computing device of claim 35, wherein:
the processor is configured with processor-executable instructions to perform operations such that receiving metadata comprises receive metadata indicating a library is frequently downloaded, wherein described in the metadata the library has a portion that is statistically likely needed before other portions for execution based on observed statistical information; and
the processor is configured with processor-executable instructions to perform operations further comprising downloading the portion of the library first based on the metadata.

44. The computing device of claim 43, wherein the processor is configured with processor-executable instructions to perform operations further comprising:
downloading the most likely executable library portion first before other portions of the library.

45. The computing device of claim 35, wherein the processor is configured with processor-executable instructions to perform operations further comprising:
generating additional metadata from browsing habits that comprise requests and responses to requests; and
providing the additional metadata to a peer device of the computing device.

46. The computing device of claim 35, wherein:
the processor is configured with processor-executable instructions to perform operations such that receiving metadata comprises receiving metadata indicating that a first portion of code is at least one of analyzed, downloaded, parsed, or executed more often than a second portion; and
the processor is configured with processor-executable instructions to perform operations further comprising reordering and downloading the first portion of code before the second portion.

47. The computing device of claim 35, wherein the processor is configured with processor-executable instructions to perform operations further comprising:
downloading first portions of webpages before other portions based on statistical browsing habits contained in the received metadata.

48. The computing device of claim 35, wherein the processor is configured with processor-executable instructions to perform operations further comprising:
preloading portions of webpages identified using statistical browsing habits contained in the metadata.

49. The computing device of claim 35, wherein:
the processor is configured with processor-executable instructions to perform operations such that receiving metadata comprises receiving metadata that allows the computing device to execute the webpage in a more efficient manner by executing necessary portions; and
the processor is configured with processor-executable instructions to perform operations further comprising forgoing executing an entire webpage.

50. The computing device of claim 35, wherein the processor is configured with processor-executable instructions to perform operations further comprising:
pre-caching the received metadata to assist the computing device in parsing, analyzing, or executing the requested webpage.

51. A computing device, comprising:
a display;
an internal memory; and
a processor coupled to the display and the internal memory, wherein the processor is configured with processor-executable instructions to perform operations comprising:
transmitting a request for a webpage;
transmitting a request for metadata regarding the requested webpage to a browser assistance server; and
receiving the metadata from the browser assistance server to assist the computing device in parsing, analyzing, or executing the requested webpage;
receiving additional metadata from a peer device that correlates to portions of the webpage that are popular with computing devices connected to the peer device, wherein the additional metadata describes a portion of the webpage that is most likely to be executed based on statistical observed browsing patterns observed from the computing devices connected to the peer device; and
loading the popular portions first on a web browser.

52. A non-transitory computer-readable storage medium having stored thereon processor executable instructions configured to cause a computing device processor to perform operations comprising:
transmitting a request for a webpage;
transmitting a request for metadata regarding the requested webpage to a browser assistance server;
receiving the metadata from the browser assistance server to assist the computing device in parsing, analyzing, or executing the requested webpage, wherein the metadata indicates that a library of the webpage includes a portion that is determined most likely to be executed based on statistical observed browsing patterns observed from a plurality of peer computing devices;

downloading the library portion most likely to be executed before other portions of the library;

executing the downloaded library portion of the requested webpage on the computing device to render the requested webpage; and sending results from processing and rendering the requested webpage to the browser assistance server to provide feedback.

53. The non-transitory computer-readable medium of claim 52, wherein the stored processor-executable instructions are configured to cause the computing device processor to perform operations further such that receiving metadata comprises receiving data selected from the group consisting of:

JavaScript function execution probabilities;
AST data for parsing data;
script token data;
lexing information;
returned binary code from data processed at a server to assist the computing device;
CSS metadata to assist in processing CSS webpage data at the computing device;
JavaScript metadata to assist in processing JavaScript webpage data at the computing device;
HTML metadata to assist in processing HTML webpage data at the computing device; and
combinations thereof.

54. The non-transitory computer-readable medium of claim 52, wherein:

the stored processor-executable instructions are configured to cause the computing device processor to perform operations further comprising using the metadata to assist in loading portions of the webpage before other portions.

55. The non-transitory computer-readable medium of claim 52, wherein the stored processor-executable instructions are configured to cause the computing device processor to perform operations such that receiving metadata comprises receiving statistics regarding a portion of code that has a predetermined probability of execution.

56. The non-transitory computer-readable medium of claim 52, wherein the stored processor-executable instructions are configured to cause the computing device processor to perform operations further comprising:

receiving metadata that comprises translated binary code resulting from JavaScript code executed on a server to increase processing at the server and reduce processing at the computing device.

57. The non-transitory computer-readable medium of claim 52, wherein the stored processor-executable instructions are configured to cause the computing device processor to perform operations such that receiving metadata comprises receiving analytics that correlate to portions of the webpage that are popular so a web browser on the computing device loads the popular portions first.

58. The non-transitory computer-readable medium of claim 52, wherein the stored processor-executable instructions are configured to cause the computing device processor to perform operations further comprising:

monitoring web browsing habits of a user of the computing device;

sending information regarding the user web browsing habits to a server; and receiving metadata from the server based in part on the user web browsing habits.

59. The non-transitory computer-readable medium of claim 52, wherein the stored processor-executable instructions are configured to cause the computing device processor to perform operations further comprising:

monitoring web browsing habits of a user of the computing device; and preloading into memory webpage elements frequently accessed by the user.

60. The non-transitory computer-readable medium of claim 52, wherein:

the stored processor-executable instructions are configured to cause the computing device processor to perform operations such that receiving metadata comprises receive metadata indicating a library is frequently downloaded, wherein described in the metadata the library has a portion that is statistically likely needed before other portions for execution based on observed statistical information; and the stored processor-executable instructions are configured to cause the computing device processor to perform operations further comprising downloading the portion of the library first based on the metadata.

61. The non-transitory computer-readable medium of claim 60, wherein the stored processor-executable instructions are configured to cause the computing device processor to perform operations further comprising:

downloading the most likely executable library portion first before other portions of the library.

62. The non-transitory computer-readable medium of claim 52, wherein:

the stored processor-executable instructions are configured to cause the computing device processor to perform operations such that receiving metadata comprises receiving metadata indicating that a first portion of code is at least one of analyzed, downloaded, parsed, or executed more often than a second portion; and the stored processor-executable instructions are configured to cause the computing device processor to perform operations further comprising reordering and downloading the first portion of code before the second portion.

63. The non-transitory computer-readable medium of claim 52, wherein the stored processor-executable instructions are configured to cause the computing device processor to perform operations further comprising:

downloading first portions of webpages before second portions based on statistical browsing habits contained in the received metadata.

64. The non-transitory computer-readable medium of claim 52, wherein the stored processor-executable instructions are configured to cause the computing device processor to perform operations further comprising:

preloading portions of webpages identified using statistical browsing habits contained in the metadata.

65. The non-transitory computer-readable medium of claim 52, wherein:

the stored processor-executable instructions are configured to cause the computing device processor to perform operations such that receiving metadata comprises receiving metadata that allows the computing device to execute the webpage in a more efficient manner by executing necessary portions; and the stored processor-executable instructions are configured to cause the computing device processor to perform operations further comprising forgoing executing an entire webpage.

66. The non-transitory computer-readable medium of claim 52, wherein the stored processor-executable instructions are configured to cause the computing device processor to perform operations further comprising:
pre-caching the received metadata to assist the computing device in parsing, analyzing, or executing the requested webpage.

67. A non-transitory computer-readable storage medium having stored thereon processor executable instructions configured to cause a computing device processor to perform operations comprising:
transmitting a request for a webpage;
transmitting a request for metadata regarding the requested webpage to a browser assistance server; and
receiving the metadata from the browser assistance server to assist the computing device in parsing, analyzing, or executing the requested webpage, wherein:
the stored processor-executable instructions are configured to cause the computing device processor to perform operations such that receiving metadata comprises receiving metadata from a peer device that correlates to portions of the webpage that are popular with computing devices connected to the peer device based on statistical observed browsing patterns observed from the computing devices connected to the peer device; and
the stored processor-executable instructions are configured to cause the computing device processor to perform operations further comprising loading the popular portions first on a web browser.

68. A computing device, comprising:
means for transmitting a request for a webpage;
means for transmitting a request for metadata regarding the requested webpage to a browser assistance server;
means for receiving the metadata from the browser assistance server to assist the computing device in parsing, analyzing, or executing the requested webpage, wherein the metadata indicates that a library of the requested webpage includes a portion that is determined most likely to be executed based on statistical observed browsing patterns observed from a plurality of peer computing devices;
means for downloading the library portion most likely to be executed before other portions of the library;
means for executing the downloaded library portion of the requested webpage on the computing device to render the requested webpage; and
means for sending results from processing and rendering the requested webpage to the browser assistance server to provide feedback of a quality of service of the metadata.

69. The computing device of claim 68, wherein means for receiving metadata comprises means for receiving data selected from the group consisting of:
JavaScript function execution probabilities;
AST data for parsing data;
script token data;
lexing information;
returned binary code from data processed at a server to assist the computing device;
CSS metadata to assist in processing CSS webpage data at the computing device;
JavaScript metadata to assist in processing JavaScript webpage data at the computing device;
HTML metadata to assist in processing HTML webpage data at the computing device; and
combinations thereof.

70. The computing device of claim 68, wherein
the computing device further comprising means for using the metadata to assist in loading portions of the webpage before other portions.

71. The computing device of claim 68, wherein means for receiving metadata comprises means for receiving statistics regarding a portion of code that has a predetermined probability of execution.

72. The computing device of claim 68, wherein means for receiving metadata comprises means for receiving translated binary code resulting from JavaScript code executed on a server to increase processing at the server and reduce processing at the computing device.

73. The computing device of claim 68, wherein means for receiving metadata comprises means for receiving analytics that correlate to portions of the webpage that are popular so a web browser on the computing device loads the popular portions first.

74. The computing device of claim 68, further comprising:
means for monitoring web browsing habits of a user of the computing device;
means for sending information regarding the user web browsing habits to a server; and
means for receiving metadata from the server based in part on the user web browsing habits.

75. The computing device of claim 68, further comprising:
means for monitoring web browsing habits of a user of the computing device; and
means for preloading into memory webpage elements frequently accessed by the user.

76. The computing device of claim 68, wherein:
means for receiving metadata comprises means for receiving metadata indicating a library is frequently downloaded, wherein described in the metadata the library has a portion that is statistically likely needed before other portions for execution based on observed statistical information; and
the computing device further comprises means for downloading the portion of the library first based on the metadata.

77. The computing device of claim 76, further comprising:
means for downloading the most likely executable library portion first before other portions of the library.

78. The computing device of claim 68, further comprising:
means for generating additional metadata from browsing habits that comprise requests and responses to requests; and
means for providing the additional metadata to a peer device of the computing device.

79. The computing device of claim 68, wherein:
means for receiving metadata comprises means for receiving metadata indicating that a first portion of code is at least one of analyzed, downloaded, parsed, or executed more often than a second portion; and
the computing device further comprises means for reordering and downloading the first portion of code before the second portion.

80. The computing device of claim 68, further comprising:
means for downloading first portions of webpages before second portions based on statistical browsing habits contained in the received metadata.

81. The computing device of claim 68, further comprising:
means for preloading portions of webpages identified using statistical browsing habits contained in the metadata.

82. The computing device of claim 68, wherein:
means for receiving metadata comprises means for receiving metadata that allows the computing device to execute the webpage in a more efficient manner by executing necessary portions; and
the computing device further comprises means for forgoing executing an entire webpage.

83. The computing device of claim 68, further comprising:
means for pre-caching the received metadata to assist the computing device in parsing, analyzing, or executing the requested webpage.

84. A computing device, comprising:
means for transmitting a request for a webpage;
means for transmitting a request for metadata regarding the requested webpage to a browser assistance server; and
means for receiving the metadata from the browser assistance server to assist the computing device in parsing, analyzing, or executing the requested webpage, wherein:
means for receiving metadata comprises means for receiving metadata from a peer device that correlates to portions of the webpage that are popular with computing devices connected to the peer device based on statistical observed browsing patterns observed from the computing devices connected to the peer device; and
the computing device further comprises means for loading the popular portions first on a web browser.

85. A server, comprising:
a processor;
a network interface coupled to the processor and configured to enable the processor to communicate with a cellular communication network; and
a memory coupled to the processor,
wherein the processor is configured with processor-executable instructions to perform operations comprising:
receiving a request for a webpage from a computing device;
receiving a request for metadata regarding the requested webpage to a browser assistance server from the computing device, wherein the metadata describes that a library of the webpage includes a portion that is determined most likely to be executed based on statistical observed browsing patterns observed from a plurality of peer computing devices;
transmitting to the computing device the requested webpage, the metadata configured to assist the computing device in parsing, analyzing, or executing the requested webpage code on the computing device for rendering the requested webpage on the computing device, and the library portion most likely to be executed before other portions of the library based on the metadata; and
receiving results from processing and rendering of the requested webpage from the computing device to provide feedback of a quality of service of the metadata.

86. The server of claim 85, wherein the processor is configured with processor executable instructions to perform operations further comprising:
receiving from the plurality of peer computing devices web usage information regarding web usage habits of the plurality of peer computing devices; and
generating the metadata based on the received usage information and an analysis of web usage habits of the plurality of peer computing devices.

87. The server of claim 85, wherein the processor is configured with processor executable instructions to perform operations further comprising:
transmitting a binary pre-compiled translation of JavaScript within the requested webpage to the computing device.

88. The server of claim 85, wherein the processor is configured with processor executable instructions to perform operations further comprising:
gathering aggregate information on browsing habits of the plurality of peer computing devices, wherein the aggregate information is provided by instrumented web browsers operating on the plurality of peer computing devices; and
generating the metadata based on aggregate information on browsing habits of the plurality of peer computing devices.

89. The server of claim 88, wherein the processor is configured with processor executable instructions to perform operations further comprising:
determining from the aggregate information on browsing habits of the plurality of peer computing devices when a peer computing device is likely to view a first portion of a webpage before other portions; and
transmitting the first portion of the webpage to the computing device before other portions of the webpage.

90. The server of claim 88, wherein the processor is configured with processor executable instructions to perform operations further comprising:
generating metadata indicating browsing habits of the plurality of peer computing devices;
determining which portions of webpages are statistically likely to be accessed before other portions of the webpage based on the metadata;
determining that a second portion is likely not accessed frequently; and
communicating in the metadata that the second portion is not accessed frequently an downloaded lower in priority than portions statistically more likely to be accessed.

91. The server of claim 88, wherein the processor is configured with processor-executable instructions to perform operations further comprising:
formulating a plurality of observed profiles of the plurality of peer computing devices;
monitoring browsing habits of a computing device user; and
transmitting metadata from the server to the computing device based on at least one observed profile that matches the computing device user based on the monitored browsing habits.

92. A non-transitory computer-readable storage medium having stored thereon processor executable instructions configured to cause a server processor to perform operations, comprising:
receiving a request for a webpage from a computing device;
receiving a request for metadata regarding the requested webpage to a browser assistance server from the computing device, wherein the metadata describes that a library of the webpage includes a portion that is determined most likely to be executed based on statistical observed browsing patterns observed from a plurality of peer computing devices;

transmitting to the computing device the requested webpage, the metadata configured to assist the computing device in parsing, analyzing, or executing the requested webpage code on the computing device for rendering the requested webpage on the computing device, and the library portion most likely to be executed before other portions of the library based on the metadata; and receiving results from processing and rendering of the requested webpage data from the computing device to provide feedback of a quality of service of the metadata.

93. The non-transitory computer-readable medium of claim 92, wherein the stored processor-executable instructions are configured to cause a server processor to perform operations further comprising:

receiving from the plurality of peer computing devices web usage information regarding web usage habits of the plurality of peer computing devices; and generating the metadata based on the received usage information and an analysis of web usage habits of the plurality of peer computing devices.

94. The non-transitory computer-readable medium of claim 92, wherein the stored processor-executable instructions are configured to cause a server processor to perform operations further comprising:

transmitting a binary pre-compiled translation of JavaScript within the requested webpage to the computing device.

95. The non-transitory computer-readable medium of claim 92, wherein the stored processor-executable instructions are configured to cause a server processor to perform operations further comprising:

gathering aggregate information on browsing habits of the plurality of peer computing devices, wherein the aggregate information is provided by instrumented web browsers operating on the plurality of peer computing devices; and generating the metadata based on aggregate information on browsing habits of the plurality of peer computing devices.

96. The non-transitory computer-readable medium of claim 95, wherein the stored processor-executable instructions are configured to cause a server processor to perform operations further comprising:

determining from the aggregate information on browsing habits of the plurality of peer computing devices when the peer computing devices are likely to view a first portion of a webpage before other portions; and transmitting the first portion of the webpage to the computing device before other portions of the webpage.

97. The non-transitory computer-readable medium of claim 95, wherein the stored processor-executable instructions are configured to cause a server processor to perform operations further comprising:

generating metadata indicating browsing habits of the plurality of peer computing devices;

determining which portions of webpages are statistically likely to be accessed before other portions of the webpage based on the metadata;

determining that a second portion is likely not accessed frequently; and communicating in the metadata that the second portion is not accessed frequently and downloaded lower in priority than portions statistically more likely to be accessed.

98. The non-transitory computer-readable medium of claim 95, wherein the stored processor-executable instructions are configured to cause a server processor to perform operations further comprising:

formulating a plurality of observed profiles of the plurality of peer computing devices;

monitoring browsing habits of a computing device user; and transmitting metadata from the server to the computing device based on at least one observed profile that matches the computing device user based on the monitored browsing habits.

99. A server, comprising:

means for receiving a request for a webpage from a computing device;

means for receiving a request for metadata regarding the requested webpage to a browser assistance server from the computing device, wherein the metadata describes that a library of the webpage includes a portion that is determined most likely to be executed based on statistical observed browsing patterns observed from a plurality of peer computing devices;

means for transmitting to the computing device the requested webpage, the metadata configured to assist the computing device in parsing, analyzing, or executing the requested webpage code on the computing device for rendering the requested webpage on the computing device, and the library portion most likely to be executed before other portions of the library based on the metadata; and means for receiving results from processing and rendering of the requested webpage data from the computing device to provide feedback of a quality of service of the metadata.

100. The server of claim 99, further comprising:

means for receiving from the plurality of peer computing devices web usage information regarding web usage habits of the plurality of peer computing devices; and means for generating the metadata based on the received usage information and an analysis of web usage habits of the plurality of peer computing devices.

101. The server of claim 99, further comprising:

means for transmitting a binary pre-compiled translation of JavaScript within the requested webpage to the computing device.

102. The server of claim 99, further comprising:

means for gathering aggregate information on browsing habits of the plurality of peer computing devices, wherein the aggregate information is provided by instrumented web browsers operating on the plurality of peer computing devices; and means for generating the metadata based on aggregate information on browsing habits of the plurality of peer computing devices.

103. The server of claim 102, further comprising:

means for determining from the aggregate information on browsing habits of the plurality of peer computing devices when the peer computing devices are likely to view a first portion of a webpage before other portions; and means for transmitting the first portion of the webpage to the computing device before other portions of the webpage.

104. The server of claim 102, further comprising:

means for generating metadata indicating browsing habits of the plurality of peer computing devices;

means for determining which portions of webpages are statistically likely to be accessed before other portions of the webpage based on the metadata;

means for determining that a second portion is likely not accessed frequently; and means for communicating in the metadata that the second portion is not accessed frequently and downloaded lower in priority than portions statistically more likely to be accessed.

105. The server of claim 102, further comprising:

means for formulating a plurality of observed profiles of the plurality of peer computing devices;

means for monitoring browsing habits of a computing device user; and means for transmitting metadata from the server to the computing device based on at least one observed profile that matches the computing device user based on the monitored browsing habits.

106. A system, comprising:

a server;

a cellular communications network; and a computing device interconnected to the server through the cellular communications network, wherein the computing device comprises:

a display;

an internal memory; and a processor coupled to the display and the internal memory, wherein the computing device processor is configured with processor-executable instructions to perform operations comprising:

transmitting a request for a webpage;

transmitting a request to the server for metadata regarding the requested webpage to a browser assistance server, wherein the metadata describes that a library of the webpage includes a portion that is determined most likely to be executed based on statistical observed browsing patterns observed from a plurality of peer computing devices, downloading and executing the library portion before other portions of the library of the requested webpage to render the requested webpage; and sending results from processing and rendering the requested webpage on the computing device to the browser assistance server to provide feedback of a quality of service of the metadata;

wherein the server is configured to perform operations comprising:

transmitting to the computing device the metadata configured to assist the computing device in parsing, analyzing, or executing the requested webpage; and receiving the results from processing and rendering the requested webpage data from the computing device.

107. The system of claim 106, wherein:

the server is configured to perform operations further comprising:

generating metadata indicating a library is frequently downloaded; and indicating in the metadata that the library has a first portion that is likely needed before other portions for execution of the requested webpage, and the computing device processor is configured with processor-executable instructions to perform operations further comprising:

downloading the first portion of the library before other portions of the library based on the metadata.

108. The system of claim 106, wherein:

the computing device processor is configured with processor-executable instructions to perform operations further comprising sending browsing data from an Internet browser to the server; and the server is configured to perform operations further comprising generating the metadata from the browser data received from the computing device.

109. The system of claim 106, wherein:

the server is configured to perform operations further comprising:

monitoring browsing habits from the plurality of peer computing devices;

determining that a particular webpage is frequently accessed by the plurality of peer computing devices; and storing webpage elements in a cache based on the browsing habits of the plurality of peer computing devices; and the computing device processor is configured with processor-executable instructions to perform operations further comprising downloading the webpage elements from the cache before an anticipated request by a user for the webpage.

110. The system claim 106, wherein the server is configured to perform operations further comprising:

processing a JavaScript portion of the requested webpage to generate native code; and returning the generated native code to the computing device in response to the request for the webpage.

111. The system of claim 106, wherein the server is configured to perform operations further comprising:

gathering web usage information from the plurality of peer computing devices; and generating the metadata based on the gathered web usage information.

112. The system of claim 11, wherein:

the server is configured to perform operations further comprising determining that a user of the computing device is likely to view a first portion of the requested webpage before other portions based on a profile of the user, wherein the metadata transmitted to the computing device indicates that the user is likely to view the first portion of the requested webpage;

wherein the computing device processor is configured with processor-executable instructions to perform operations further comprising downloading the first portion of the requested webpage before other portions of the webpage.

113. The system of claim 106, wherein the server does not host the requested webpage.

114. A system, comprising:

a server;

a cellular communications network; and a computing device interconnected to the server through the cellular communications network, wherein the computing device comprises:

means for transmitting a request for a webpage; and means for transmitting a request to the server for metadata regarding the requested webpage to a browser assistance server, wherein the metadata describes that a library of the webpage includes a portion that is determined most likely to be executed based on statistical observed browsing patterns observed from a plurality of peer computing devices;

means for downloading and executing the most likely to be executed library portion before other portions of the library of the requested webpage to render the requested webpage; and means for sending results from processing and rendering the requested webpage to the browser assistance server to provide feedback of a quality of service of the metadata;

wherein the server comprises:
means for transmitting metadata to the computing device configure to assist the computing device in parsing, analyzing, or executing the requested webpage; and
means for receiving the results from processing and rendering of the requested webpage data from the computing device.

115. The system of claim 114, wherein:
the server further comprises:
means for generating metadata indicating a library is frequently downloaded; and
means for indicating in the metadata that the library has a first portion that is likely needed before other portions for execution of the requested webpage, and the computing device further comprises means for downloading the first portion of the library before other portions of the library based on the metadata.

116. The system of claim 114, wherein:
the computing device further comprises means for sending browsing data from an Internet browser to the server; and
the server further comprises means for generating the metadata from the browser data received from the computing device.

117. The system of claim 114, wherein:
the server further comprises:
means for monitoring browsing habits from the plurality of peer computing devices;
means for determining that a particular webpage is frequently accessed by the plurality of peer computing devices; and
means for storing webpage elements in a cache based on the browsing habits of the plurality of peer computing devices;
and the computing device further comprises means for downloading the webpage elements from the cache before an anticipated request by a user for the webpage.

118. The system claim 114, wherein the server further comprises:
means for processing a JavaScript portion of the requested webpage to generate native code; and
means for returning the generated native code to the computing device in response to the request for the webpage.

119. The system of claim 114, wherein the server further comprises:
means for gathering web usage information from the plurality of peer computing devices; and
means for generating the metadata based on the gathered web usage information.

120. The system of claim 119, wherein:
the server further comprises means for determining that a user of the computing device is likely to view a first portion of the requested webpage before other portions based on a profile of the user, wherein the metadata transmitted to the computing device indicates that the user is likely to view the first portion of the requested webpage;
wherein the computing device further comprises means for downloading the first portion of the requested webpage before other portions of the webpage.

121. The system of claim 114, wherein the server does not host the requested webpage.

122. A method for assisting the rendering of a webpage on a remote computing device, comprising:
receiving a request for the webpage from the computing device;
receiving a request for metadata regarding the requested webpage to a browser assistance server from the computing device, wherein the metadata describes that a library of the webpage includes a portion that is determined most likely to be executed based on statistical observed browsing patterns observed from a plurality of peer computing devices;
transmitting to the computing device the requested webpage, the metadata configured to assist the computing device in parsing, analyzing, or executing the requested webpage code on the computing device for rendering the requested webpage on the computing device, and the library portion most likely to be executed before other portions of the library based on the metadata; and
receiving results from processing and rendering of the requested webpage data from the computing device to provide feedback of a quality of service of the metadata.

123. The method of claim 122, further comprising:
receiving from a plurality of computing devices web usage information regarding web usage habits of the plurality of peer computing devices; and
generating the metadata based on the received usage information and an analysis of web usage habits of the users of the plurality of computing devices.

124. The method of claim 122, further comprising:
transmitting a binary pre-compiled translation of JavaScript within the requested webpage to the computing device.

125. The method of claim 122, further comprising:
gathering aggregate information on browsing habits of the plurality of peer computing devices, wherein the aggregate information is provided by instrumented web browsers operating on the plurality of peer computing devices; and
generating the metadata based on aggregate information on browsing habits of the plurality of peer computing devices.

126. The method of claim 125, further comprising:
determining from the aggregate information on browsing habits of the plurality of peer computing devices when the peer computing devices are likely to view a first portion of a webpage before other portions; and
transmitting the first portion of the webpage to the computing device before other portions of the webpage.

127. The method of claim 125, further comprising:
generating metadata indicating browsing habits of the plurality of peer computing devices;
determining which portions of webpages are statistically likely to be accessed before other portions of the webpage based on the metadata;
determining that a second portion is likely not accessed frequently; and
communicating in the metadata that the second portion is not accessed frequently and downloaded lower in priority than portions statistically more likely to be accessed.

128. The method of claim 125, further comprising:
formulating a plurality of observed profiles of the plurality of peer computing devices;
monitoring browsing habits of a computing device user; and transmitting metadata from the server to the computing device based on at least one observed profile that matches the computing device user based on the monitored browsing habits.

* * * * *